(12) United States Patent
Kim et al.

(10) Patent No.: US 10,237,055 B1
(45) Date of Patent: Mar. 19, 2019

(54) METHOD AND SYSTEMS FOR RADIO TRANSMISSION WITH DISTRIBUTED CYCLIC DELAY DIVERSITY

(71) Applicant: Mitsubishi Electric Research Laboratories, Inc., Cambridge, MA (US)

(72) Inventors: Kyeong Jin Kim, Lexington, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/838,607

(22) Filed: Dec. 12, 2017

(51) Int. Cl.
| | |
|---|---|
| *H04L 7/08* | (2006.01) |
| *H04L 7/00* | (2006.01) |
| *H04B 1/7073* | (2011.01) |
| *H04B 1/7097* | (2011.01) |
| *H04L 27/26* | (2006.01) |
| *H04B 7/06* | (2006.01) |

(52) U.S. Cl.
CPC .............. *H04L 7/08* (2013.01); *H04B 1/7073* (2013.01); *H04B 1/7097* (2013.01); *H04L 7/0091* (2013.01); *H04B 7/0608* (2013.01); *H04B 2201/7073* (2013.01); *H04L 27/2607* (2013.01); *H04L 27/2646* (2013.01)

(58) Field of Classification Search
CPC ..... H04L 7/08; H04L 7/0091; H04L 27/2646; H04L 27/2607; H04B 1/7097; H04B 1/7073; H04B 7/0608; H04B 2201/7073
See application file for complete search history.

(56) References Cited

U.S. PATENT DOCUMENTS

| | | | |
|---|---|---|---|
| 6,842,487 B1 * | 1/2005 | Larsson | H04B 7/0671 375/260 |
| 7,436,903 B2 * | 10/2008 | Sandhu | H04B 7/0671 331/34 |

(Continued)

OTHER PUBLICATIONS

Afif Ossseiran et al., "Relay Cyclic Delay Diversity: Modeling and System Performance," Signal Processing and Communications, 2007. ICSPC 2007. IEEE International Conference On, IEEE, Piscataway, NJm USA. Nov. 24, 2007. pp 25-28.

(Continued)

*Primary Examiner* — Kenneth T Lam
(74) *Attorney, Agent, or Firm* — Gene Vinokur; James McAleenan; Hironori Tsukamoto

(57) ABSTRACT

Systems and methods for a communication system including a set of transmitters, wherein operations of the set of transmitters are synchronized with an accuracy bound by a synchronization error. A controller forms a message with ordered symbols including data symbols and at least one identification symbol, and controls transmitters from the set of transmitters to transmit the message using a cyclic delay diversity (CDD). Wherein each transmitting transmitter prior to transmitting, circularly rotates the ordered symbols of the message with a unique shift, then copies some symbols located at an end of the message. Wherein a number of the copied symbols is based on a predetermined cyclic prefix length, into a first position in the rotated message, to form a transmitter identifiable message, and transmits via each transmitting transmitter the transmitter identifiable message.

19 Claims, 19 Drawing Sheets

(56) References Cited

U.S. PATENT DOCUMENTS

| | | |
|---|---|---|
| 8,687,617 B2 | 4/2014 | Agrawal et al. |
| 8,792,369 B2 | 7/2014 | Alanara |
| 9,749,027 B2 | 8/2017 | Montojo et al. |
| 2006/0013186 A1* | 1/2006 | Agrawal .............. H04B 7/2656 370/344 |
| 2009/0276672 A1* | 11/2009 | Lee ...................... H04B 7/0671 714/749 |
| 2016/0286510 A1* | 9/2016 | Soulhi .................... H04L 63/10 |

OTHER PUBLICATIONS

Harry Z B Chen Et al., "Distributed Generalized Cyclic Delay Diversity for Cooperative OFDM Systems," Vehicular Technology Conference, 2008. VTC Spring 2008. IEEE Piscataway NJ USA. May 11, 2008. pp. 1241-1245.

Mang Liao et al., "Cyclic Delay Transmission for Unique Word OFDM Systems," Science China Information Sciences, vol. 57, No. 8, Apr. 16, 2014. pp. 1-9.

Kim et al., "Diversity Gain Analysis of Distributed CDD Systems in Non Identical Frequency Selective Fading," 2018-IEEE International Conference on Communications, May 20, 2018. pp. 1-6.

\* cited by examiner

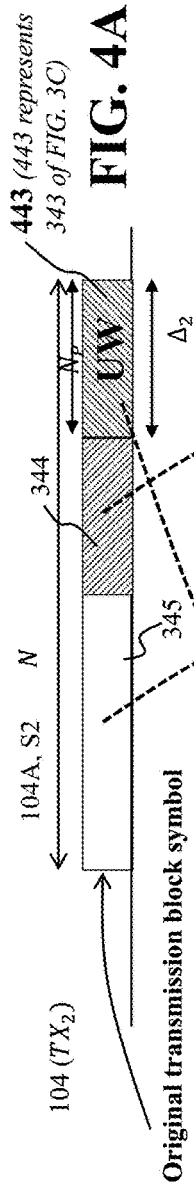
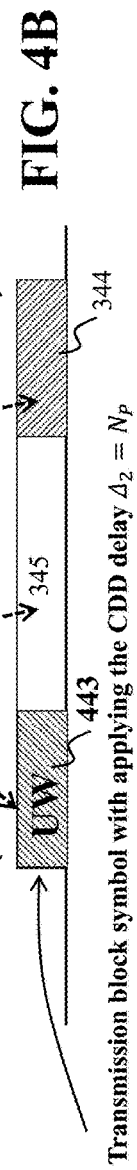
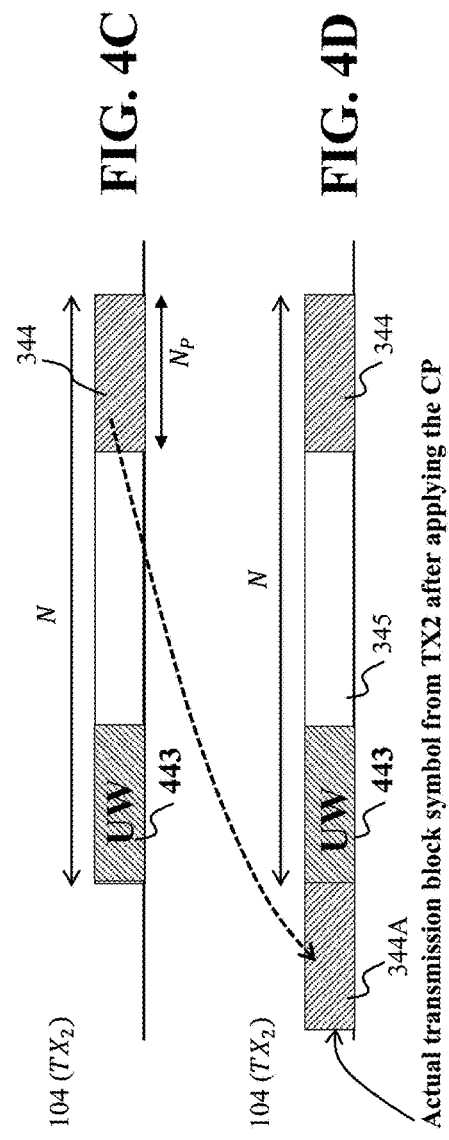

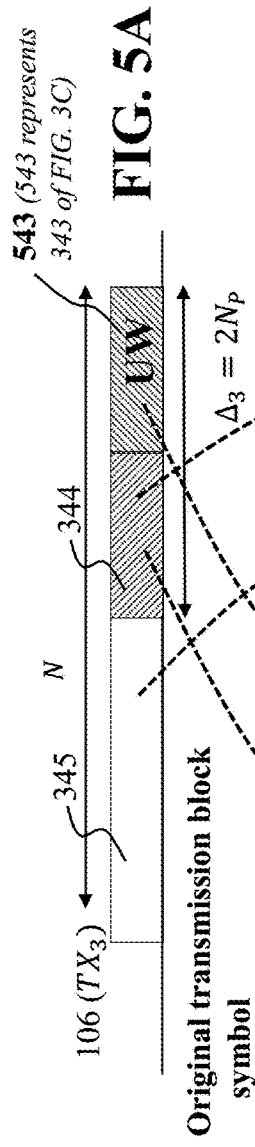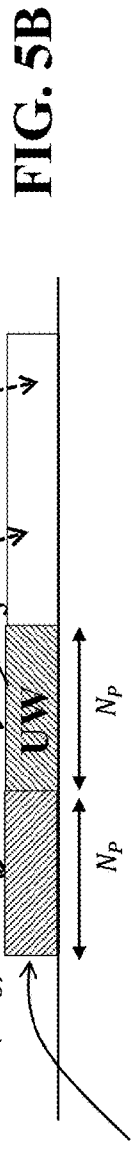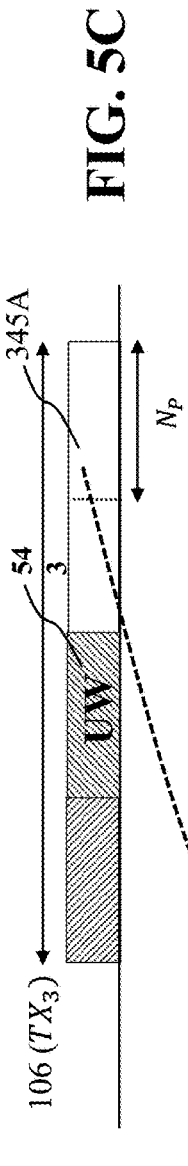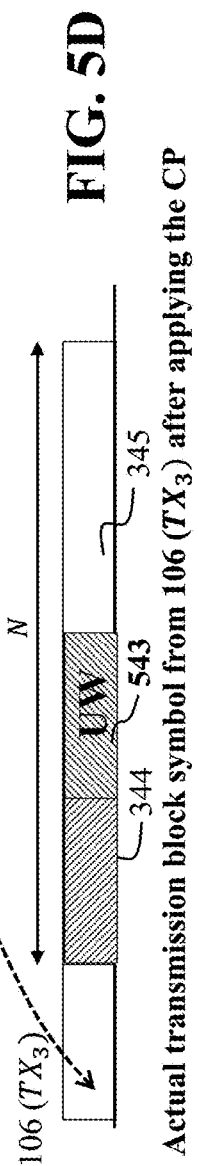

METHOD AND SYSTEMS FOR RADIO TRANSMISSION WITH DISTRIBUTED CYCLIC DELAY DIVERSITY

FIELD

The present disclosure relates to generally to communication networks, and more particularly, to radio transmission with distributed cyclic delay diversity.

BACKGROUND

There is an increasing interest to increase the data throughput and to make more efficient use of the available spectrum in wireless data communication systems. Orthogonal Frequency Division Multiplexing (OFDM) modulation techniques with fixed cyclic prefixes are being used as one of the methods to achieve these goals. However, depending upon the application of the communication system, for example, intelligent transportation networks, maximum efficiency use of the available spectrum is certainly valued and sought after, but more importantly, the reliability on performance of the communication system/network is more valued and even imperative, when considering sustained economic success for the intelligent transportation service provider along with ensuring their consumer's safety.

The OFDM is a form of multi-carrier modulation scheme that is capable of overcoming the frequency selectivity of the radio channels and providing high data rates without an Inter-Carrier Interference (ICI) and other interferences. However, in multipath fading channels, the time variation of a fading channel over an OFDM symbol period destroys the orthogonality between the sub-channel A circular extension, i.e., cyclic prefix, is added at the front of OFDM symbols in order to eliminate both intersymbol interference (ISI) and other interferences. For example, the cyclic prefix, which is a copy of an end of an OFDM symbol is placed at the beginning, and often used to address dispersion associated with multipath channel. The cyclic prefix, if not long enough to cover the delay spread of the wireless channel can result in having an unreliable network. However, the cyclic prefixes of each OFDM symbol, however, consume significant bandwidth and therefore reduce throughput. Also, the cyclic prefix is a predetermined and has a fixed length. U.S. Pat. No. 8,792,369 B2 discloses use of a node specific cyclic delay. However, U.S. Pat. No. 8,792,369 B2 does not teach how to address/compute simultaneous transmission from a set of transmitters, and how many transmitters need to be supported without interfering each other. Further, U.S. Pat. No. 8,792,369 B2 does many features of the present disclosure.

Thus, there is a need for communication systems and methods for communicating content over wireless communication networks that use cyclic prefixes to provide reliable and improved throughput.

SUMMARY

The present disclosure relates to communication networks, including radio transmission with distributed cyclic delay diversity that determine lengths of cyclic prefixes.

Initially, one embodiment of the present disclosure includes a communication system having a controller connected to a set of transmitters. The controller can form a message with symbols including data symbols and an identification symbol. The controller can control the set of transmitters to transmit the message using a cyclic delay diversity (CDD), such that each transmitter circularly rotates the symbols of the message with a unique shift and copies the last symbol in the rotated message into the first position in the message. For example, by applying a different circular rotation of the unique word, the receiver can detect whether a particular device uses a CDD operation or not. Thus, the receiver can easily detect a fixed number of devices that apply CDD operation. After detection of the CDD transmitters, the receiver can combine the signal only from the CDD transmitters. At least one aspect of the above embodiment is that the controller can form a plurality of different messages, such that the data symbols can vary for at least some of the different messages, and the identification symbol can be fixed for all different messages. Wherein the identification symbol is also referred to as a unique word (UW) through the present disclosure.

Specifically, embodiments of the present disclosure are based on many recognitions, some recognitions are gained through experimentation, while others are discovered gradually overtime. For example, at least one recognition is that a diversity scheme improves the reliability of a message by transmitting over multiple communication channels having different characteristics. Wherein, a cyclic delay diversity (CDD) is a diversity scheme used in OFDM-based and single carrier-based telecommunication systems to achieve the diversity gain from only one transmitter with multiple antennas. The length of a cyclic prefix can be more than channel tap delay. The CDD for OFDM does not require feedback and synchronization.

Some embodiments are based on an understanding that CDD schemes designed for a single transmitter can be extended to a concurrent transmission from multiple transmitters. Where, an extended CDD transmission can be used by road side units in a vehicle-to-infrastructure (V2I) setting, and remote radio head (RRH) in a cloud-radio access network (C-RAN) to achieve cooperative diversity gain, among other things, by coordinating several transmitters, each transmitter sends a delayed copy of information to the receiver. We refer to this extended CDD transmission from multiple transmitters as distributed CDD.

To that end, some embodiments of the present disclosure are based on the realization a cooperative communication system can have a distributed CDD scheme, that includes a set of spatially distributed cooperating transmitters, rather than only one transmitter as conventional CDD schemes are constructed. However, unlike in the conventional existing works/schemes that use a single transmitter, embodiments of the present disclosure include a system setting, where the CDD scheme is employed among antennas that are installed at the same transmitter. In general, considering hardware complexity and power at the RRH type transmitters, only one antenna can be employed, depending upon the specific application. From this reason, among other reasons, the existing conventional construct teachings are not applicable in regard to the embodiments of the present disclosure's system setting(s). At least one aspect of the present disclosure is that some embodiments provide for a CDD scheme over spatially distributed transmitters equipped with a single antenna, among other things.

Since many different types of transmissions can coexist within the same frequency band, it is necessary to find a right set of transmitters that apply CDD operation. For this problem, the present disclosure provides at least one method for making proper transmitter selection for CDD operation in the presence of multiple different types of transmissions. In fact, some of the embodiment of the present disclosure can be transmitters equipped with a single antenna that can be distributed in space to support wireless access to users.

During experimentation, aspects learned included such distributed CDD transmission phases, presented a number of challenges including how to overcome conventional construct teachings for CDD transmission for a single transmitter with multiple antennas. For example, although the distributed CDD scheme can achieve a higher throughput, identifying or figuring out which transmitters actually apply to the CDD scheme, as well as addressing the intrinsic problem of intersymbol interference (ISI) from other transmitters while having multiple transmitter involved in simultaneous transmission, all needed to be overcome. Thus, the present disclosure found necessary to develop an ISI-free CDD scheme. Another challenge is the issue that because CDD operation can be performed by block-wised processing, determining how many transmitters to be assigned as the CDD transmitters, without causing any ISI, also needed to be overcome. Further still, since a particular CDD delay can be assigned at any of the CDD transmitters, determining how to assign a CDD delay to a particular CDD transmitter had to be addressed.

To that end, the spatially distributed transmitters needed to be synchronized. The present disclosure includes embodiments based on understanding that a Global Positioning System (GPS) includes a universal clock which can be used to provide timing for a control unit (CU) to synchronize the set of transmitters within the CDD scheme to correct for a propagation delay and obtain a universal clock for the cooperative communication system.

Further, due to potential significant spatial separation of the transmitters from each other, different transmitters can have different tap delays for their corresponding communication channels with the receiver. For example, the signal power propagates isotropically in space, and it is degraded inversely proportional to the square of the distance traveled. Thus, the significant spatial separation results in different tap delays depending on the random distance from a particular transmitter to the receiver. An aspect as why this is important, among many aspects, is since a path causing a larger delay spread (or larger tap delay) can be much easier to cause ISI, resulting in the need to take care of a different delay spread over the paths from the transmitters to the receiver. By choosing the cyclic prefix whose size is larger than the maximum tap delay, the present disclosure provides a method that removes ISI, among other things. Thus, different time delays need to be considered for the cooperative transmission via distributed CDD. An aspect as to why this needs to be considered, among many reasons, includes that in present disclosures novel distributed CDD scheme, different delay spreads over the paths can be also considered in designing the CDD delay and selecting CDD transmitters among coexisting transmitters.

Further, still another challenge with regard to the set of spatially distributed cooperating transmitters, is due to the joint usage of bandwidth allocated for the transmission, the receiver may receive different kind of signals comprising of several number of data symbols. Due to the co-existence of different types of transmissions, the received signal is the mixture from a different transmission power, signal structure, and cooperative scheme. For instance, one transmission applies the CDD scheme, whereas other transmissions do not apply the CDD scheme. Thus, some of the signals can be transmitted from different transmitters using different cooperative transmission schemes and/or independently from each other. To that end, there is a need to distinguish a transmission via distributed CDD from other types of transmissions.

For example, distinguishing the transmission from other types of transmission can be useful, in part, when the CDD operation is unique for a particular transmission. The signals received by different types of transmissions will be interference to a desired received signal. Thus, it is necessary to distinguish a transmission that applies CDD operation from other transmissions that do not apply CDD operation. For this purpose, a unique preamble or signal structure can be used first. By applying the cross correlation with respect to a unique preamble, the receiver can find a desired set of transmitters that apply the desired transmission.

Since the number of CDD transmitters can be limited by a fixed number, it is also necessary to distinguish CDD transmitters from non-CDD transmitters. Since some embodiments of the present disclosure use a unique identification symbol as the cyclic prefix, and when its locations are predetermined for all CDD transmitters, then the receiver searches a set of desired CDD transmitters for its reception process. At least one advantage can include providing a way to find CDD transmitters among coexisting transmitters that use different types of transmissions, so as to provide a way to increase throughput, by removing ISI and other interferences, in its reception process.

Embodiments of the present disclosure can use a Global Positioning System (GPS) that includes a universal clock which can be used to provide timing for a control unit (CU). The control unit may synchronize the set of transmitters within the CDD scheme to correct for a propagation delay and obtain a universal clock for the cooperative communication system, which results in reducing the need for tight synchronization within the system. This universal clock can provide synchronization that achieves and maintains coordination among the local clocks in the independent set of transmitters to provide a common notion of time across the set of transmitters in the cooperative communication system. Based on this configuration, an average time error produced by the GPS receiver may be reduced within 100 nanoseconds, among other things. Thus, by knowing the components of the cooperative communication system, i.e. CDD scheme, transmitters, receivers and GPS timing, etc., it is possible to determine a synchronization delay or synchronization error for the cooperative communication system specific to the present disclosure.

Some embodiments are based on realization that the problem with synchronization error and differences in tap delays for different communication channels in distributed CDD can be addressed through selecting a proper length of a cyclic prefix. Some embodiments of the present disclosure use a signal structure with a unique identification symbol used as the cyclic prefix. Wherein the length of the identification symbol needs to be larger than the maximum tap delay over the channels from a desired set of transmitters to the receiver. For this signal structure, when we apply the cyclic shifting for the remaining part of the data packet except with the unique word, then ISI is appeared in receiver operation. Thus, the desired throughput is not achievable.

To overcome this problem of losing throughput for this new signal structure, some embodiments provide for a CDD scheme that applies the cyclic shifting for the entire data symbols including the identification symbol. For example, taking into account this synchronization error, the systems and methods of the present disclosure are also based on another realization, of combining the synchronization error with a maximum tap delay of the set of cooperating transmitters, to obtain a minimum length CP. Further, a tap delay can be determined for a communication channel between a receiver and each transmitter in the set of transmitters to produce a set of tap delays for the cooperative communication system. Wherein, a maximum tap delay may be obtained from the set of tap delays. The realization was made by combining the synchronization error with the maximum tap delay, to obtain a minimum length CP which can be used for transmitting a message, via the set of transmitters.

Further still, by taking into account the synchronization error and the multipath delay together, the maximum CP is determined for all the transmitters which resulted in substantially removing ISI along with achieving a maximum diversity gain possible by the distributed CDD. At least one advantage, among many advantages of the distributed CDD of the present disclosure, is being able to achieve the diversity gain by transmitting a common symbol block without requiring channel state information (CSI) at the transmitters. Furthermore, the distributed CDD of the present disclosure demonstrated that full diversity gain can be achieved without employing forward error correction (FEC) coding by employing cyclic-prefixed single carrier (CP-SC) transmission with CDD under some requirements. In addition, the use of distributed CDD or cooperative CDD of the present disclosure, provides a more reliable communication network, among other things.

Some embodiments are based on realization that the problem of identification of distributed CDD transmission can be addressed by inserting an identification symbol in the transmitted signal. Through experimentation, the present disclosure gained the realization that the identification symbol can be any symbol with unique value known to the transmitter and the receiver. For example, to help solve the problem of identification of the distributed CDD transmission, by using an identification symbol inserted at a beginning, at an end of a group of transmitted symbols, or any place in the transmitted symbols, resulted in providing for an identification of the signal. For example, one way to do that is to insert the identification symbol at a predetermined place in the transmitted signal. The identification symbol can be any symbol with unique value known to the transmitter and the receiver.

Since this identification symbol is unique for CDD transmitters, the receiver can detect the transmitters that transmit a signal including this identification symbol, that is, a target transmission that applies CDD operation. By applying the cross correlation to the received signal with respect to the identification symbol, the receiver can find CDD transmitters at a particular location of the transmitted symbols. Thus, a unique CDD transmitter can be identified.

According to another embodiment of the present disclosure a communication system including a set of transmitters, wherein operations of the set of transmitters are synchronized with an accuracy bound by a synchronization error. A controller forms a message with ordered symbols including data symbols and at least one identification symbol, and controls transmitters from the set of transmitters to transmit the message using a cyclic delay diversity (CDD). Wherein each transmitting transmitter prior to transmitting, circularly rotates the ordered symbols of the message with a unique shift, then copies some symbols located at an end of the message. Wherein a number of the copied symbols is based on a predetermined cyclic prefix length, into a first position in the rotated message, to form a transmitter identifiable message, and transmits via each transmitting transmitter the transmitter identifiable message.

According to another embodiment of the present disclosure a method for transmitting a message that is a non-data-aided signal from transmitters in a set of transmitters to a receiver, wherein operations of the set of transmitters are synchronized with a synchronization error. The method including forming, via a processor, a message with ordered symbols including data symbols and at least one identification symbol. Controlling, via the processor, the transmitters in the set of transmitters to transmit the message using a cyclic delay diversity (CDD). Wherein each transmitting transmitter prior to transmitting, circularly rotates the ordered symbols of the message with a unique shift, then copies some symbols located at an end of the message. Wherein a number of the copied symbols is based on a predetermined cyclic prefix length, into a first position in the rotated message, to form a transmitter identifiable message, and transmits via each transmitting transmitter the transmitter identifiable message. Wherein the processor is communicatively connected to the set of transmitters and the receiver.

According to another embodiment of the present disclosure a non-transitory computer readable storage medium embodied thereon a program executable by a processor for performing a method. The method including acquiring a synchronization error bounding an accuracy of a synchronization of operations of a set of transmitters. Forming, via the processor, a message with ordered symbols including data symbols and at least one predetermined identification symbol. Controlling, via the processor, transmitters from the set of transmitters to transmit the message using a cyclic delay diversity (CDD). Wherein each transmitting transmitter prior to transmitting, circularly rotates the ordered symbols of the message with a unique shift, then copies some symbols located at an end of the message. Wherein a number of the copied symbols is based on a predetermined cyclic prefix length, into a first position in the rotated message, to form a transmitter identifiable message, and transmits via each transmitting transmitter the transmitter identifiable message. Wherein the processor is communicatively connected to the set of transmitters and the receiver.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4A, FIG. 4B, FIG. 4C and FIG. 4D are schematics illustrating step 362 of FIG. 3A, according to embodiments of the present disclosure;

FIG. 5A, FIG. 5B, FIG. 5C and FIG. 5D are schematics illustrating step 372 of FIG. 3A, according to embodiments of the present disclosure;

Figure 1A:
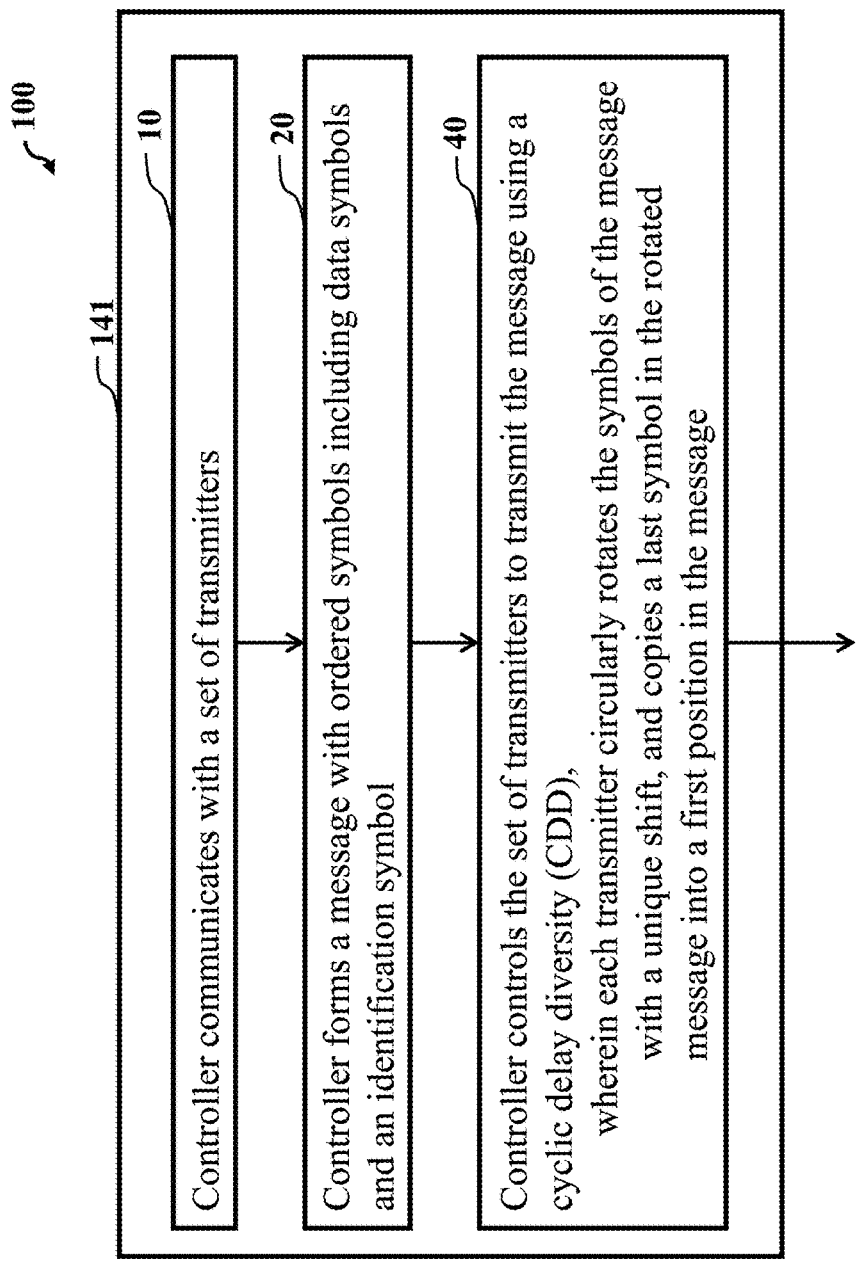
FIG. 1A is a block diagram of a communication system with a distributed CDD scheme having a unique identification symbol, according to an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

The present disclosure relates to communication networks, including radio transmission with distributed cyclic delay diversity that determine lengths of cyclic prefixs.

Initially, one embodiment of the present disclosure includes a communication system having a controller connected to a set of transmitters. The controller can form a message with symbols including data symbols and an identification symbol. The controller can control the set of transmitters to transmit the message using a cyclic delay diversity (CDD), such that each transmitter circularly rotates the symbols of the message with a unique shift and copies the last symbol in the rotated message into the first position in the message. For example, by applying a different circular rotation of the unique word, the receiver can detect whether a particular device uses a CDD operation or not. Thus, the receiver can easily detect a fixed number of devices that apply CDD operation. After detection of the CDD transmitters, the receiver can combine the signal only from the CDD transmitters. At least one aspect of the above embodiment is that the controller can form a plurality of different messages, such that the data symbols can vary for at least some of the different messages, and the identification symbol can be fixed for all different messages.

Specifically, embodiments of the present disclosure are based on many recognitions, some recognitions are gained through experimentation, while others are discovered gradually overtime. For example, at least one recognition is that a diversity scheme improves the reliability of a message by transmitting over multiple communication channels having different characteristics. Wherein, a cyclic delay diversity (CDD) is a diversity scheme used in OFDM-based and single carrier-based telecommunication systems to achieve the diversity gain from only one transmitter with multiple antennas. The length of a cyclic prefix can be more than channel tap delay. The CDD for OFDM does not require feedback and synchronization.

Some embodiments of the present disclosure are based on the realization a cooperative communication system can have a distributed CDD scheme, that includes a set of spatially distributed cooperating transmitters, rather than only one transmitter as conventional CDD schemes are constructed. At least one aspect of the present disclosure is that some embodiments provide for a CDD scheme over spatially distributed transmitters equipped with a single antenna, among other things. Since many different types of transmissions can be coexisted at the same frequency band, it is necessary to find a right set of transmitters that apply CDD operation. For this problem, the present disclosure provides at least one method for making proper CDD operation in the presence of multiple different types of transmissions. In fact, some of the embodiment of the present disclosure can be a single antenna equipped with transmitters that can be distributed in space to support wireless access to users.

During experimentation, the present disclosure found necessary to develop an ISI-free CDD scheme. To that end, the spatially distributed transmitters needed to be synchronized. The present disclosure includes embodiments based on understanding that a Global Positioning System (GPS) includes a universal clock which can be used to provide timing for a control unit (CU) to synchronize the set of transmitters within the CDD scheme to correct for a propagation delay and obtain a universal clock for the cooperative communication system.

Further, due to potential significant spatial separation of the transmitters from each other, different transmitters can have different tap delays for their corresponding communication channels with the receiver. For example, the signal power propagates isotopically in space, and it is degraded inversely proportional to the square of the distance traveled. Thus, the significant spatial separation results in different tap delays depending on the random distance from a particular transmitter to the receiver. At least one challenge with regard to the set of spatially distributed cooperating transmitters, is due to the joint usage of bandwidth allocated for the transmission, the receiver may receive different kind of signals comprising of several number of data symbols. Due to the co-existence of different types of transmissions, the received signal is the mixture from a different transmission power, signal structure, and cooperative scheme. For instance, one transmission applies the CDD scheme, whereas other transmissions do not apply the CDD scheme. Thus, some of the signals can be transmitted from different transmitters using different cooperative transmission schemes and/or independently from each other. To that end, there is a need to distinguish a transmission via distributed CDD from other types of transmissions.

Such that, the present disclosure found that distinguishing the transmission from other types of transmission can be useful, in part, when the CDD operation is unique for a particular transmission. The signals received by different types of transmissions will be interference to a desired received signal. Thus, it is necessary to distinguish a transmission that applies CDD operation from other transmissions that do not apply CDD operation. For this purpose, a unique preamble or signal structure can be used first. By applying the cross correlation with respect to a unique preamble, the receiver can find a desired set of transmitters that apply the desired transmission. Further, since the number of CDD transmitters can be limited by a fixed number, it is also necessary to distinguish CDD transmitters from non-CDD transmitters. Since some embodiments of the present disclosure uses a unique identification symbol as the cyclic prefix, and when its locations are predetermined for all CDD transmitters, then the receiver searches a set of desired CDD transmitters for its reception process.

Embodiments of the present disclosure can use a Global Positioning System (GPS) that includes a universal clock which can be used to provide timing for a control unit (CU). The control unit may synchronize the set of transmitters within the CDD scheme to correct for a propagation delay and obtain a universal clock for the cooperative communication system, which results in reducing the need for tight synchronization within the system. This universal clock can provide synchronization that achieves and maintains coordination among the local clocks in the independent set of transmitters to provide a common notion of time across the set of transmitters in the cooperative communication system. Based on this configuration, an average time error produced by the GPS receiver may be reduced within 100 nanoseconds, among other things. Thus, by knowing the components of the cooperative communication system, i.e., CDD scheme, transmitters, receivers and GPS timing, etc., it is possible to determine a synchronization delay or synchronization error for the cooperative communication system specific to the present disclosure.

Some embodiments are based on realization that the problem with synchronization error and differences in tap delays for different communication channels in distributed CDD can be addressed through selecting a proper length of a cyclic prefix. Some embodiments of the present disclosure use a signal structure with a unique identification symbol used as the cyclic prefix. Wherein the length of the identification symbol needs to be larger than the maximum tap delay over the channels from a desired set of transmitters to the receiver. For this signal structure, when the communication systems apply the cyclic shifting for the remaining part of the data packet except with the unique word, then ISI is appeared in receiver operation. Thus, the desired throughput is not achievable.

To overcome this problem of losing throughput for this new signal structure, some embodiments provide for a CDD scheme that applies the cyclic shifting for the entire data symbols including the identification symbol or unique word (UW). For example, taking into account this synchronization error, the systems and methods of the present disclosure are also based on another realization, of combining the synchronization error with a maximum tap delay of the set of cooperating transmitters, to obtain a minimum length CP. Further, a tap delay can be determined for a communication channel between a receiver and each transmitter in the set of transmitters to produce a set of tap delays for the cooperative communication system. Wherein, a maximum tap delay may be obtained from the set of tap delays. The realization was made by combining the synchronization error with the maximum tap delay, to obtain a minimum length CP which can be used for transmitting a message, via the set of transmitters.

Further still, by taking into account the synchronization error and the multipath delay together, the maximum CP is determined for all the transmitters which resulted in substantially removing intersymbol interferences (ISI) along with achieving a maximum diversity gain possible by the distributed CDD.

Some embodiments are based on realization that the problem of identification of distributed CDD transmission can be addressed by inserting an identification symbol or UW in the transmitted signal. Through experimentation, the present disclosure gained the realization that the identification symbol can be any symbol with unique value known to the transmitter and the receiver. For example, to help solve the problem of identification of the distributed CDD transmission, by using an identification symbol inserted at a beginning, at an end of a group of transmitted symbols, or any place in the transmitted symbols, resulted in providing for an identification of the signal. For example, one way to do that is to insert the identification symbol at a predetermined place in the transmitted signal. The identification symbol can be any symbol with unique value known to the transmitter and the receiver.

Since this identification symbol is unique for CDD transmitters, the receiver can detect the transmitters that transmit a signal including this identification symbol, that is, a target transmission that applies CDD operation. By applying the cross correlation to the received signal with respect to the identification symbol, the receiver can find CDD transmitters at a particular location of the transmitted symbols. Thus, a unique CDD transmitter can be identified.

FIG. 1A is a block diagram of a communication system with a distributed CDD scheme having a unique identification symbol, according to an embodiment of the present disclosure. In particular, the communication system with distributed CDD scheme includes step 10, a controller communicatively connected to a set of transmitters. Step 20, the controller forms a message with ordered symbols including data symbols and at least one identification symbol. Step 40, the controller controls the set of transmitters to transmit the message using a cyclic delay diversity (CDD). Wherein each transmitter prior to transmitting circularly rotates the ordered symbols of the message with a unique shift, then copies some symbols located at an end of the message. Wherein a number of the copied symbols is based on a predetermined cyclic prefix length, into a first position in the rotated message, to form a transmitter identifiable message, and transmits via each transmitting transmitter the transmitter identifiable message. Some possible benefits to the above embodiment in achieving transmit diversity gain with wireless transmissions can be useful for OFDM and single carrier transmissions which uses a unique word as the cyclic prefix, for example, in an 802.11ad system, or other systems.

For example, by applying a different circular rotation of the identification symbol or UW, the receiver can detect whether a particular device uses a CDD operation or not. Thus, the receiver can easily detect a fixed number of devices that apply CDD operation. After detection of the CDD transmitters, the receiver can combine the signal only from the CDD transmitters. At least one aspect of the above embodiment is that the controller can form a plurality of different messages, such that the data symbols can vary for at least some of the different messages, and the identification symbol can be fixed for all different messages.

Still referring to FIG. 1A, at least one other aspect of the above embodiment is that the controller has knowledge about a tap delay for a communication channel between a receiver and each transmitter in the set of transmitters can produce a set of tap delays. Further, the controller can determine a minimal length of a cyclic prefix as a function of a sum of a synchronization error of operations of the transmitter and a maximal tap delay in the set of tap delays. Along with control at least some transmitters in the set of transmitters to transmit the message to the receiver using the CDD with the cyclic prefix having at least the minimal length.

Optionally, in some embodiments, the controller can be further configured to have knowledge about a tap delay for a communication channel between a receiver and each transmitter in the set of transmitters to produce a set of tap delays. Along with determining a minimal length of a cyclic prefix as a function of a sum of the synchronization error and a maximal tap delay in the set of tap delays. So as to control at least some transmitters in the set of transmitters to transmit the message to the receiver using the CDD with the cyclic prefix having at least the minimal length.

Still referring to FIG. 1A, other embodiments may include, in instances when the size of the cyclic prefix, $N_P$, is large, which may limit the number of CDD transmitters and reduce throughput. Contemplated in such a scenario, i.e., if it is required to increase the throughput, different identification symbols, which are orthogonal to one another, may be used. Since identification symbols are orthogonal, more use of the CDD transmitters can be identified at the receiver. Further, the more CDD transmitters are involved in CDD operation, a much higher throughput can be obtained, according to the present disclosure.

However, through further experimentation the present disclosure gained another realization that the insertion of the identification symbol into the predetermined place in the signal, may violate the principles used by the CDD transmission, and can lead to the intercarrier interference (ICI). For example, if the data symbols are rotated while the identification symbol remains at a predetermined place, then the permutation matrix, violates the circulant matrix. Let $\Delta_k$ be the CDD delay assigned to the kth CDD transmitter. The kth CDD transmitter applies circular shifting operation by using $\Delta_k$, which can be expressed by applying the permutation shifting matrix $P_N^{\Delta_k}$. A circulant matrix can be defined by row vectors, where each row vector is rotated one element to the right relative to the preceding row vector. This permutation matrix is obtained by circularly shifting down the identity matrix $I_N$, where N is the number of the transmitted symbols in one transmission signal from a CDD transmitter. For instance, $P_{N=4}^{\Delta_k=1}$ is given by $$P_{N=4}^{\Delta_k=1} = \begin{bmatrix} 0 & 1 & 0 & 0 \\ 0 & 0 & 1 & 0 \\ 0 & 0 & 0 & 1 \\ 1 & 0 & 0 & 0 \end{bmatrix}.$$

Still referring to FIG. 1A, note that $P_{N=4}^{\Delta_k=1}$ is circulant and unitary matrices. Using this permutation matrix, the received signal after removing the CP signal from the kth CDD transmitter is given by $$r_k = H_k P_N^{\Delta_k} s$$

where $H_k$ is an equivalent channel matrix, which is also a circulant matrix, and S is the original symbols. Since the product of two circulant matrices becomes a new circulant matrix, the product of $H_k P_N^{\Delta_k}$ becomes another circulant matrix. Now since we have simultaneous transmissions from multiple CDD transmissions, the received signal from them is given by $$r = \sum_{k=1}^{K} H_k P_N^{\Delta_k} s = H_{CDD} s$$

where $H_{CDD}$ is the equivalent channel matrix supported by K CDD transmitters. Since the circulant channel matrix is specified by its first column vector, $h_{CDD}$, we can design it as follows:

$$h_{CDD} = \begin{bmatrix} h_1 \\ 0 \\ h_2 \\ 0 \\ \vdots \\ h_k \\ 0 \\ \vdots \\ h_K \\ 0 \end{bmatrix},$$

where $h_k$ denotes the channel vector from the kth CDD transmitter to the receiver. Since the size of the cyclic prefix is equal to the maximum delay tap, additional zeros need to be appended after the channel vector to have the same length as the cyclic prefix, which is denoted by $N_P$. From the expression for the equivalent channel vector $h_{CDD}$, there is no overlapping between the channel vectors, so that an ISI free transmission can be achieved. That is, if the CDD delay satisfies $\Delta_k=(i-1)N_P$ with $\Delta_0=0$, then ISI can ICI can be removed in reception process of the receiver. From this knowledge, it is necessary that the permutation matrix should be circulant matrix, otherwise ISI is appeared in reception process of the receiver.

Specifically, the present disclosure realized through experimentation that the circular rotation for CDD operation with respect to the original symbols can be represented by the permutation matrix. This permutation matrix can be a circulant matrix to make inter-channel interference free operation. Below is a definition of the circulant matrix, along with some benefits and usefulness in making an ISI and ICI free operation. For example, the ICI can also degrade the throughput as ISI, which means that the ICI needs to be removed from reception process of the receiver. From the equivalent channel vector, $h_{CDD}$, ICI can be removed entirely, which results from a well-designed cyclic delay $\Delta_k$. When the size of the cyclic prefix is larger than the maximum delay tap over the channels from the CDD transmitters to the receiver, ICI can be entirely removed. However, if the remaining symbols are rotated while the identification symbol remains at a predetermined place, then the permutation matrix violates the circulant matrix. Let blkdiag (A, B) denote a block diagonal operation made by two matrices A and B. For instance, assumed is that N=16, and $N_P$=4.

Still referring to FIG. 1A, let $$s_1 = \begin{bmatrix} s \\ UW \end{bmatrix}$$

be the transmission symbols by the first CDD transmitter with the original symbol s with its size $N-N_P$. In addition, UW denotes the identification symbol with its size $N_P$. The second CDD transmitter will apply the cyclic delay to the original symbol if we fix the identification symbol at the same location. That is, the transmission symbol will be given by $$s_2 = \begin{bmatrix} P_{12}^{\Delta_1=4} s \\ UW \end{bmatrix} = \begin{bmatrix} P_{12}^{\Delta_1=4} & \\ & I_4 \end{bmatrix} \begin{bmatrix} s \\ UW \end{bmatrix} = blkdiag(P_{12}^{\Delta_1=4}, I_4) \begin{bmatrix} s \\ UW \end{bmatrix}.$$

From this representation, $blkdiag(P_{12}^{\Delta_1=4}, I_4)$ violates the circulant matrix. Thus, in the equivalent representation of the first row vector $h_{CDD}$, overlapping between channel vectors happens, which eventually makes the receiver observe ICI and ISI. However, if we apply the circular rotation for an entire symbol $$s_1 = \begin{bmatrix} s \\ UW \end{bmatrix},$$

as $$s_2 = P_{16}^{\Delta_1=4} \begin{bmatrix} s \\ UW \end{bmatrix},$$

then UW is placed in the different location in the transmission symbols, while $P_{16}^{\Delta_1=4}$ maintains the circulant matrix. Thus, ISI and ICI will be removed from reception process of the receiver.

Still referring to FIG. 1A, to that end, some embodiments use the identification symbol in a manner consistent with the transmission of other, e.g., data, symbols in distributed CDD transmission. Specifically, after the insertion of the identification symbol in the set of symbols forming a message to be transmitted, all symbols in the message including the identification symbol are circularly shifted with a different shift for different transmitters, and the last several symbols in the message are copied as the first symbol in the message.

In such a CDD transmission, the receiver receives the identification symbols at different positions in the message. In such a manner, the receiver can not only identify that different messages belonging to the same CDD transmission, but also can determine a shift for each received message based on a number of symbols in the received message and a position of the identification symbol in the received message.

Still referring to FIG. 1A, as explained before, for the original symbol $$s_1 = \begin{bmatrix} s \\ UW \end{bmatrix},$$

if we apply the permutation matrix to $s_1$, then the location of the identification symbol UW after operation of $$s_2 = P_{16}^{\Delta_1=4} \begin{bmatrix} s \\ UW \end{bmatrix},$$

will be changed. For this example, it will be placed in the first $N_P$ data symbols. For another operation, $$s_3 = P_{16}^{\Delta_1=8} \begin{bmatrix} s \\ UW \end{bmatrix},$$

executed in the $3^{rd}$ CDD transmitter, the location of the UW will be placed in the second $N_P$ data symbols. From this exemplary setting, four CDD transmitters are selected, so that the locations of the UW will be first $N_P$, second $N_P$, and third $N_P$, and forth $N_P$ data symbols depending on $\Delta_2=4$, $\Delta_3=8$, $\Delta_4=12$, $\Delta_1=0$. Since these CDD delays are designed in removing ICI and ISI, this invention provides the maximum diversity, namely maximum throughput.

Figure 1B:
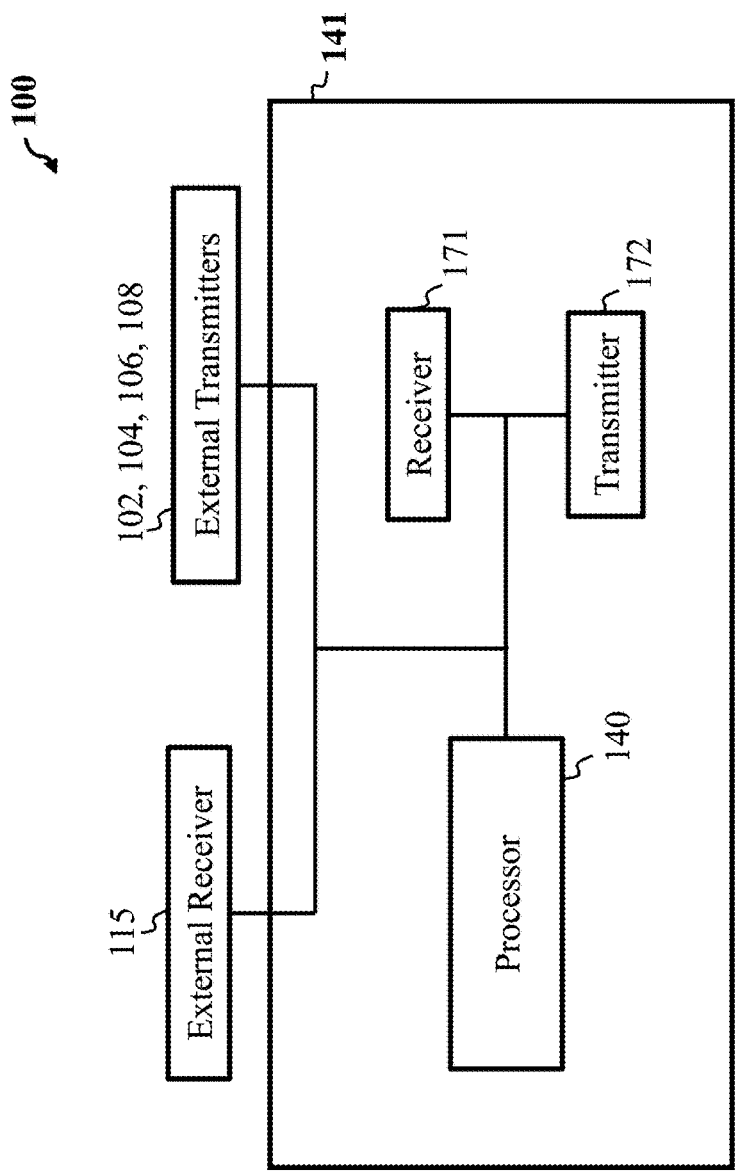
FIG. 1B is a block diagram of a control unit of FIG. 1A that includes a controller for controlling the communication system, according to an embodiment of the present disclosure.

FIG. 1B is a block diagram of a control unit of FIG. 1A that includes a controller for controlling the communication system, according to an embodiment of the present disclosure. The controller 141 can include a processor 140 in communication with a receiver 171 and a transmitter 172. Further, the controller 141 can also be in communication with an external receiver 115 and external transmitters 102, 104, 106, 108.

Figure 1C:
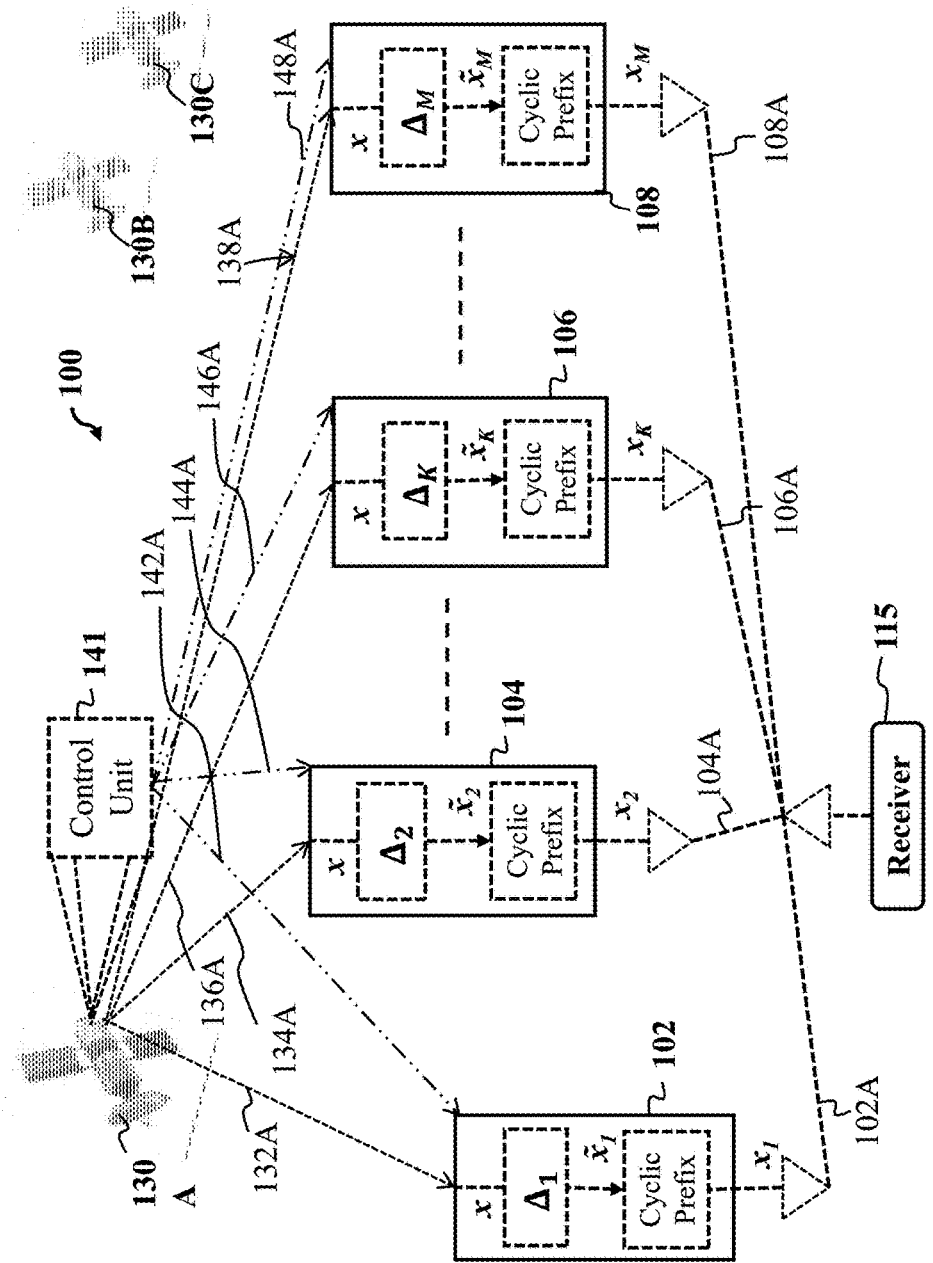
FIG. 1C is a schematic of a method for communication networks that includes determining lengths of cyclic prefixs in communication systems and the number of transmitters, according to an embodiment of the present disclosure.

FIG. 1C is a schematic of a method for communication networks that includes determining lengths of cyclic prefixs in communication systems, according to embodiments of the present disclosure. Communication system 100 includes a receiver 115 in communication with transmitters 102, 104, 106, and 108 via wirelessly 102A, 104A, 106A, and 108A. The control unit (CU) 141 is also in communication with M transmitters via channels 142A, 144A, 146A, and 148A, respectively. Further, the CU 140 is in communication with a Global Positioning System (GPS) 130A that includes a universal clock which can be used to provide timing for the control unit (CU) 141. Contemplated is that the communication may be in communication with other GPS systems 130B, 130C. The control unit 141 in communication with GPS 130A may synchronize the set of transmitters 102, 104,106, and 108 within the CDD scheme to correct for a propagation delay, which results in reducing the need for tight synchronization within the communication system. The universal clock of GPS 130A provides synchronization that achieves and maintains coordination among the local clocks in the independent transmitters of the set of transmitters 102, 104,106, and 108 to provide a common notion of time across the set of transmitters in the cooperative communication system.

For example, the controller or control unit 141 gathers a maximum time synchronization error and a measured maximum channel tap length from the receiver 115. The controller 141 can compute a maximum allowable number of transmitters considering a maximum channel tap length, a maximum time synchronization error, and a transmission symbol block size. The controller 141 chooses a number of transmitters 102, 104,106, and 108 that applies CDD. Then, assigns a different delay to a chosen transmitter. Accordingly, the receiver 115 computes the maximum channel tap length. The controller 141 provides the way to compute the CP length and the CDD delays taking account for maximum time synchronization error. The control unit 141 determines transmitters that apply CDD. Then, the control unit provides a selected CDD delay $\Delta_i$ for each transmitter, one by one. It is noted that there is a relationship between the length of the CP and the value of $\Delta$ that is used in the CDD, such that an aspect is to fit all of the transmitter CDD delays within this limit.

Figure 1D:
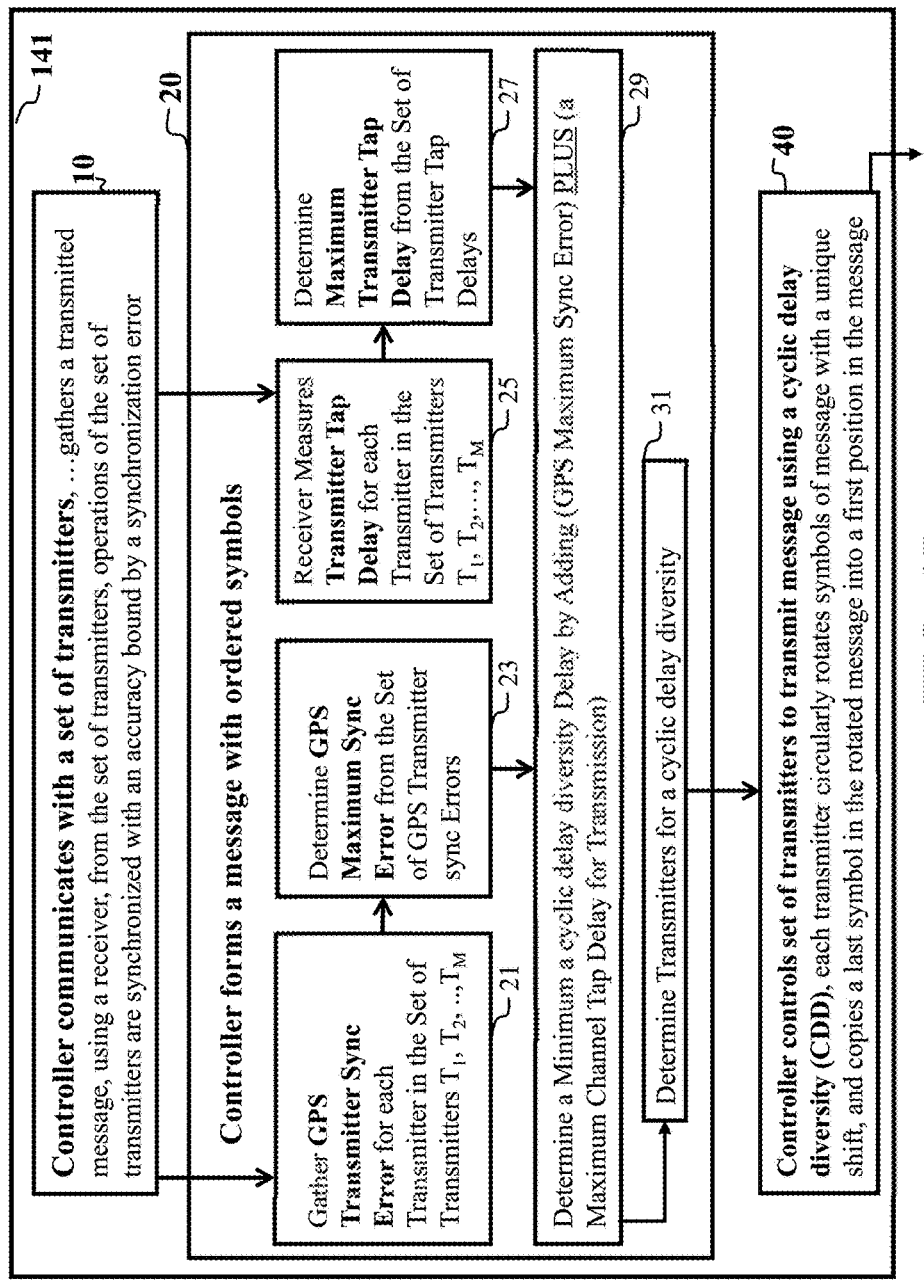
FIG. 1D is a flow diagram of the method of FIG. 1A, according to embodiments of the present disclosure.

FIG. 1D is a flow diagram of the method of FIG. 1A, according to embodiments of the present disclosure. Step 10 includes the controller communicatively connected to the set of transmitters, and gathers a transmitted message, using the receiver from the set of transmitters. Operations of the set of transmitters can be synchronized with an accuracy bound by a synchronization error.

Steps 21 to 31 are included in step 20 of FIG. 1A. For example, step 21 of FIG. 1D includes gathering the GPS Transmitter Synchronization Error $(\Delta S_1, \ldots, \Delta S_M)$ for each Transmitter in the set of Transmitters $(T_1, T_2, \ldots, T_M)$. Based on the current GPS signal, the bound on the GPS transmitter synchronization error can be found off line in line with the symbol time $T_S$. For example, a paper, "Design study for a quasi-synchronous CDMA sensor data collection system: An LEO satellite uplink access technique based on GPS", by Yijun Chen, et al in 2015, specifies the synchronization error bound $\Delta S_{bound}$ in 150 ns in year 2002. Thus, when at least four satellites are in view at a particular time instance, then all of $\Delta S_S$ are assumed to be less than $\Delta S_{bound}$.

Step 23 of FIG. 1D includes determining GPS Maximum Synchronization Error from the set of GPS Transmitter Synchronization Errors. Based on the current GPS signal, the bound on the GPS transmitter synchronization error $\Delta S_{bound}$ can be found off line. To work even in worst applications, the system needs to consider the worst synchronization error (maximum sync error) $\Delta S_{bound}$ to remove its possible appearance as inter-symbol interference. Therefore the synchronization error bound, $\Delta S_{bound}$, is considered as an upper bound on the error.

Step 25 of FIG. 1D includes the receiver 115 of FIG. 1C measuring the transmitter Tap Delay for each Transmitter in the set of transmitters $(T_1, T_2, \ldots, T_M)$. Each receiver can measure the maximum tap delay via channel sounding techniques, where the transmitters (102, 104, 106, and 108 of FIG. 1C) send known pilot signals to the receiver 115 of FIG. 1C which then measures the extent of the channel dispersion. Without an exact knowledge of the maximum tap delay, the receiver will experience inter-symbol interference. Thus, to achieve a better reliability of the receiving signal, it is necessary that the coordination processor, 141A, only knows of the maximum tap delays rather than the full channel state information.

Step 27 of FIG. 1D includes determining the maximum transmitter tap delay from the set of transmitter tap delays. The receiver 115 of FIG. 1C computes the delay spread of each channel between itself and the transmitters. Once the receiver has the set of channel delays $(N_{f1}, \ldots, N_{fM})$ it sorts them and then chooses the largest delay $N_f=\max(N_{f1}, \ldots, N_{fM})$ from the measurements.

Step 29 of FIG. 1D includes determining the minimum CDD delay length $\Delta_i$ by adding the GPS maximum synchronization error $\Delta S_{bound}$ plus the maximum transmitter tap delay $N_f$. It is important to satisfy the least overhead ratio of the additional CP length $N_P$ to the original symbol block size N. In general, less overhead (i.e., shorter CP length) is preferable. For example, if the CP length is reduced, then the transmission time can be increased. However, if we reduce the CP length without a limit, then interference will appear at the receiver. Thus, it is required to satisfy two goals; to reduce the CP length while to remove the interference at the receiver. Since the time synchronization between distributed transmitters affect the receiver performance, time synchronization error should be considered. In this aspect, we also take account the worst time synchronization error. To remove interference from the receiving signal, we need to have $N_P \geq N_f + \Delta S_{bound}$. To have the least overhead ratio, we use the CP length as $N_P = N_f + \Delta S_{bound}$. According to the computed $N_P$, the CDD delay is determined as $\Delta_i = (i-1)N_P$ with $\Delta_1 = 0$. It is noted that the result is that CP needs to extend beyond the longest channel delay spread and the effect of the GPS timing error bounds.

Step 31 of FIG. 1D determines K transmitters out of M ($M \geq K$) transmitters in applying CDD. With respect to the transmission block size N, the number of transmitters is determined by K=1+floor(N/N$_P$), where floor (.) denotes the floor function. Then, the next question is how to choose K CDD transmitters. To determine which transmitters will be chosen out of M transmitters, the receiver 115 of FIG. 1C computes the set of effective signal-to-noise ratios (SNRs) over the channels from the transmitters (102A, 104A, 106A, and 108A of FIG. 1C) to the receiver 115. For the same pilots symbols, the effective SNR for the kth transmitter is given by $\gamma_k = P_T \|h_k\|^2 / \alpha_n^2$, where $P_T$ denotes the transmit power from the transmitters, $\alpha_n^2$ denotes the noise power, and $\|h_k\|^2$ denotes the channel power for a channel vector $h_k$. Then, the receiver sorts these effective SNRs to obtain the corresponding transmitter index.

Step 40 of FIG. 1D includes the controller controlling the set of transmitters to transmit message using a cyclic delay diversity (CDD). Wherein, each transmitter circularly rotates symbols of message with a unique shift, and copies multiple last symbols in the rotated message into a first position in the message. For example, transmitters from the set of transmitters transmit a message using the CDD with the CDD delay and cyclic prefix. The CDD does the processing that is applying a different CDD delay $\Delta_i$ to a different transmitter. After applying CDD operation, the cyclic prefix is applied that is appending the last symbols where its number is same as the length of the cyclic prefix to the front of the original transmission symbol block.

Figure 1E:
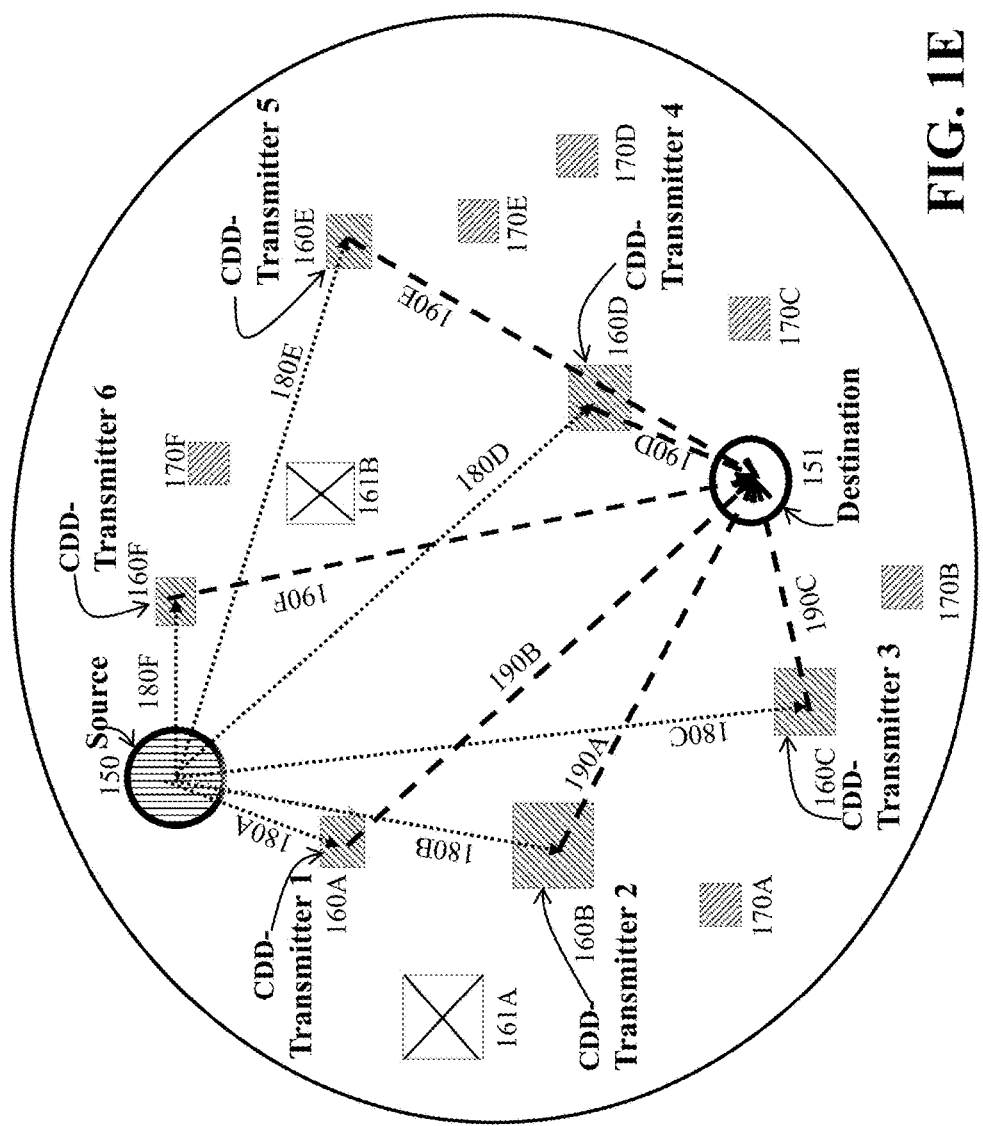
FIG. 1E is a schematic illustrating a multi-hop communication or two-hop communication, according to embodiments of the present disclosure.

FIG. 1E is a schematic illustrating a multi-hop communication or two-hop communication, according to embodiments of the present disclosure. The source node 150 makes communication with the destination node 151 via transmitters 160A-160F, and 161A-161B in the presence of transmitters 170A-170F. Transmitters 170A-170F use a different type of the transmission than transmitters 160A-160F, such that transmitters 170A-170F do not use CDD operation. Thus, these transmitters 170A-170F cause interference in reception process at the destination 151. In the first hop 180A-180F, the source chooses only 160A-160F transmitters, among the total transmitters 160A-160F and 161A-161B, to apply CDD operation. However, since the maximum number of CDD transmitters is fixed, the source node 150 chooses only transmitters 160A-160F for CDD operation. The remaining transmitters 161A-161B are refrained from transmissions in the first hop 180A-180F. The CDD transmitters 1-6, apply cyclic rotation via assigned CDD delays, and then transmit the signals to the destination 151, simultaneously in the second hop 190A-190F. However, since the interfering transmitters 170A-170F, are not controlled by the source node 150, they can send interfering signals to the destination node 151. Thus, identification of CDD transmitters 160A-160F in the presence of interfering transmitters 170A-170F is necessary to achieve the maximum throughput. The present disclosure teaches how to remove interference from transmitters 170A-170F, by non-limiting example, in distributed CDD operation, in the presence of interfering transmitters 170A-170F. Accordingly, the noted reference in the Background Section fails to disclose features of the present disclosure including, among others features: (1) use of identification symbol or unique word to identify CDD transmitters without causing ICI and ISI in the presence of interfering transmitters; (2) the circular rotation of the entire block is missing, which is at least one aspect, among many aspects, to distinguish CDD transmitters from non-CDD transmitters; (3) selection scheme for CDD transmitters based on the determined length of the message and the minimal length of the cyclic prefix; (4) there is no GPS use for a time synchronization between the control unit (CU) and transmitters; and (5) there is no time synchronization error considered in the determination of the CP length, among other things.

Figure 2A:
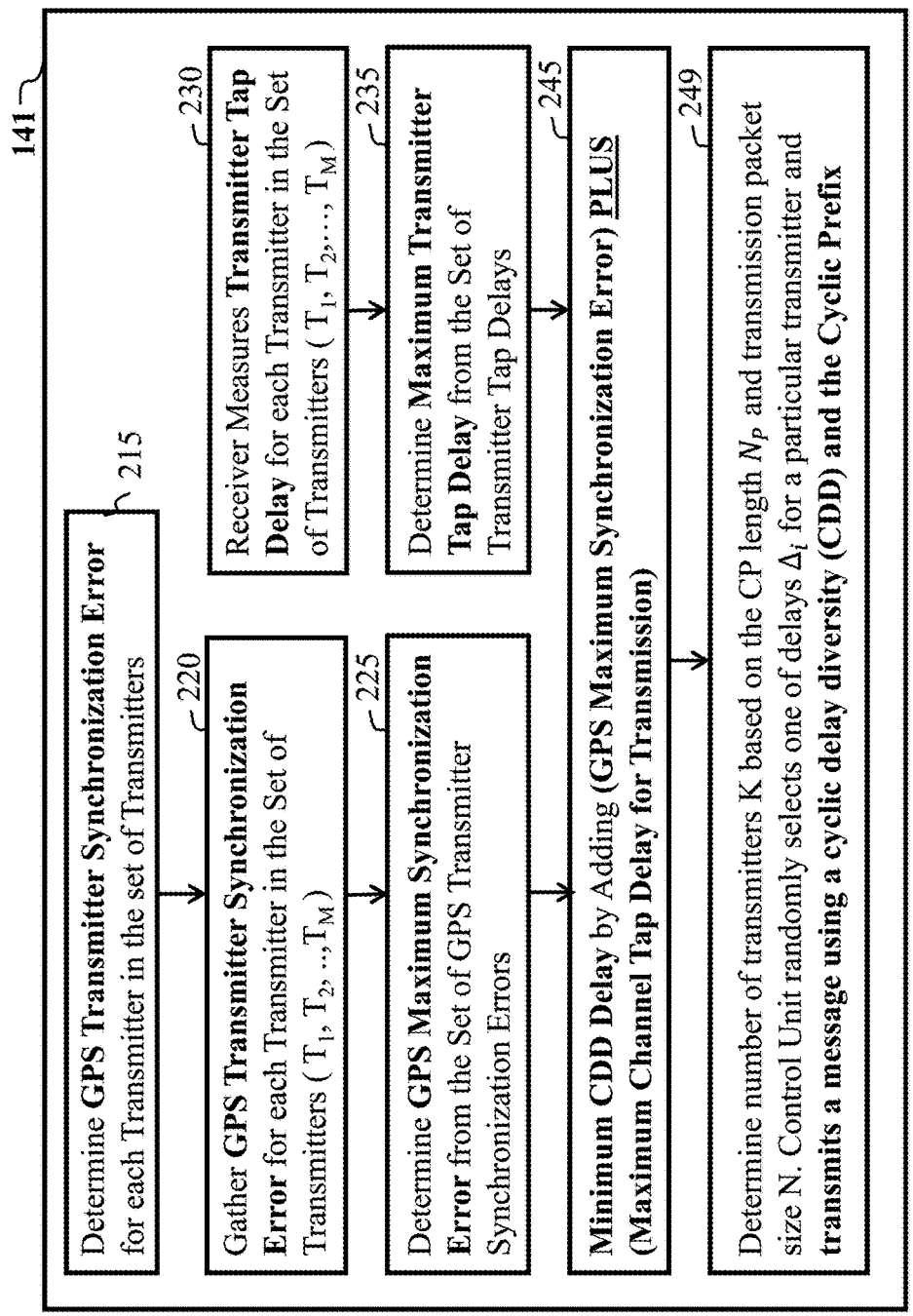
FIG. 2A is a flow diagram of another method, according to some embodiments of the present disclosure.

FIG. 2A is a flow diagram of another method, according to embodiments of the present disclosure. For example, Step 215 of FIG. 2A includes determining the GPS transmitter synchronization error for each transmitter in the set of transmitters. Step 220 of FIG. 2A includes gathers the GPS transmitter synchronization errors ($\Delta S_1, \ldots, \Delta S_M$) for each transmitter in the set of transmitters ($T_1, T_2, \ldots, T_M$). Step 225 of FIG. 2A includes determining GPS Maximum Synchronization Error from the set of GPS Transmitter Synchronization Errors.

Step 230 of FIG. 2A includes the receiver measuring the transmitter Tap Delay for each Transmitter in the set of transmitters ($T_1, T_2, \ldots T_M$). Step 235 of FIG. 2A includes determining the maximum transmitter tap delay from the set of transmitter tap delays.

Step 245 of FIG. 2A includes determining the minimum CDD delay by adding the GPS maximum synchronization error plus the maximum transmitter tap delay.

Step 249 of FIG. 2A includes determining the number of transmitters K based on maximum channel tap length $N_f$, synchronization error bound $\Delta S_{bound}$ and transmission block size N. Since there may be more number of transmitters that CDD can support, it is necessary to determine what the maximum number of transmitters will need to be. To do this, the packet size needs to be considered to remove interference. The control unit randomly selects one of delays $\Delta_i$ for a particular transmitter and transmits a message using a cyclic delay diversity (CDD) with the Minimum Length of Cyclic Prefix. If we use the maximum likelihood detector for data detection in the receiver, then the detector performance is independent of the different delay when the equivalent channel matrix is circulant. Thus, the control unit randomly selects any one of the delays that were not chosen for other transmitters for a particular transmitter and then controls this transmitter to transmit a message using the cyclic delay diversity.

Figure 2B:
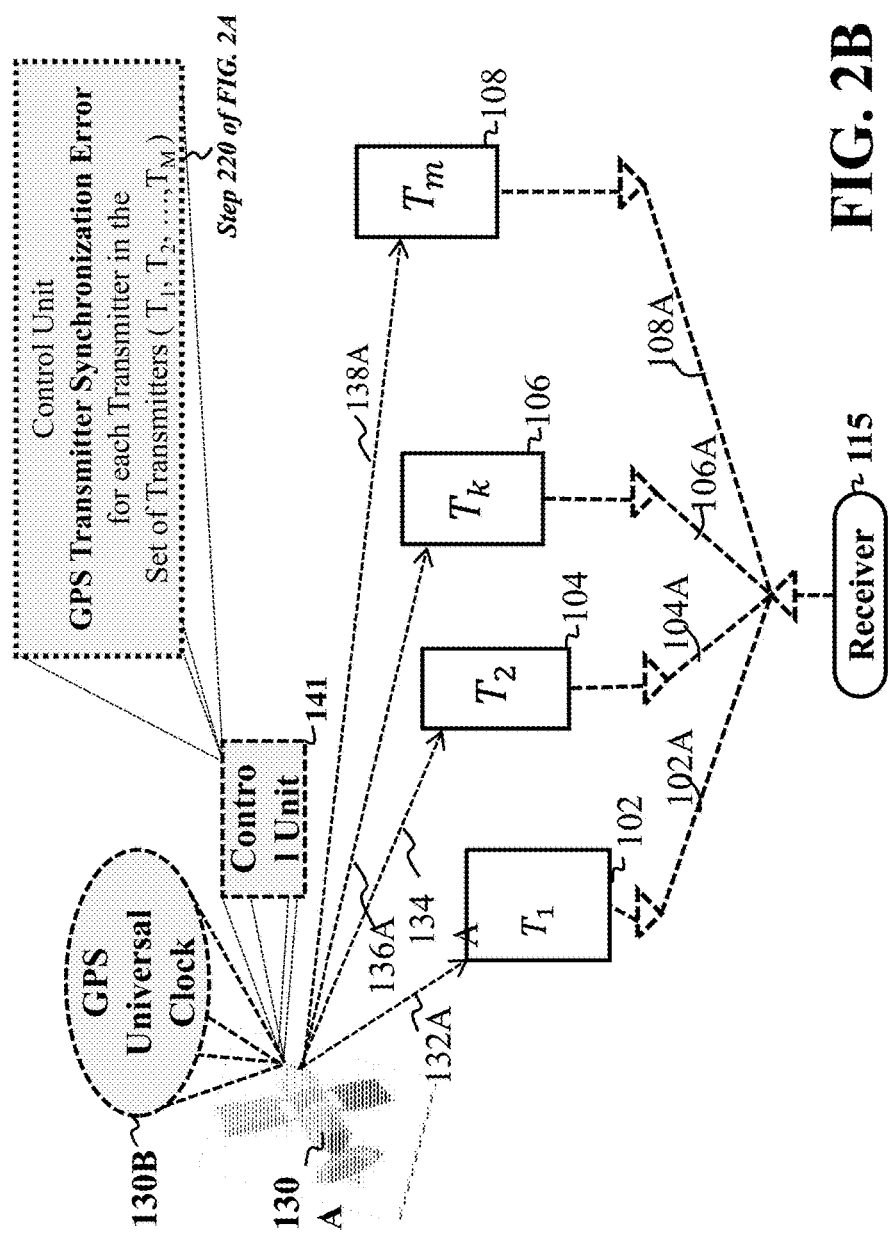
FIG. 2B is a schematic illustrating step 220 of FIG. 2A, according to embodiments of the present disclosure.

FIG. 2B is a schematic illustrating step 220 of FIG. 2A, according to embodiments of the present disclosure. The control unit 141 can gather time synchronization error off line.

Figure 2C:
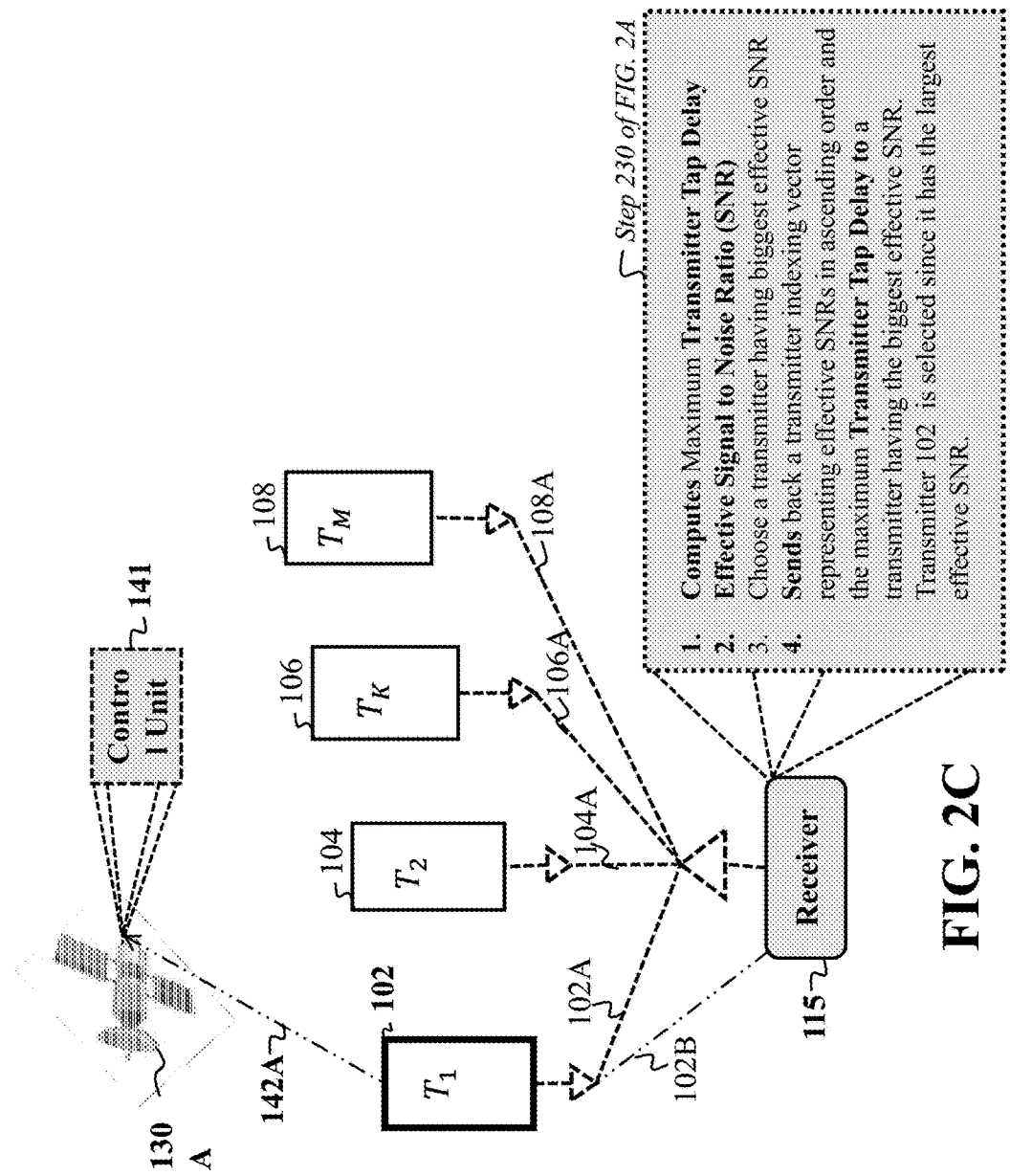
FIG. 2C is a schematic illustrating step 230 of FIG. 2A, according to embodiments of the present disclosure.

FIG. 2C is a schematic illustrating step 230 of FIG. 2A, according to embodiments of the present disclosure. The receiver operation can measure tap delays ($N_{f1}, N_{f2}, \ldots, N_{fM}$) for the links between the transmitters and itself, and then then computes the maximum tap delay $N_f = \max(N_{f1}, N_{f2}, \ldots, N_{fM})$. It also measures the effective received signal-to-noise ratios (SNRs) at the receiver over the channels 102A, 104A, 106A, and 108A. It sorts the effective received SNRs in terms of their magnitudes, and chooses a transmitter has the largest magnitude. For example, Transmitter 1, 102. For the CDD operation, the receiver 115 sends back a transmitter indexing vector representing effective SNRs in ascending order.

For example, in step 230 of FIG. 2A, the receiver 115 first measures the transmitter tap delay for each transmitter in the set of transmitters ($T_1, T_2, \ldots, T_M$), and then computes the maximum transmitter tap delay. Second, aspect includes an effective signal to noise Ratio (SNR), for each channel in the set of channels 102A, 104A, 106A, 108A. The receiver 115, then sorts effective SNRs and chooses a transmitter having the biggest effective SNR. Then, sends back a transmitter indexing vector representing effective SNRs in ascending order and the maximum transmitter tap delay to a transmitter having the biggest effective SNR. In this example, transmitter 102 is selected since it has the largest effective SNR.

Still referring to FIG. 2C, after receiving a transmitter indexing vector representing effective SNRs in ascending order and the maximum Transmitter Tap Delay from receiver 115 via a channel 102A, it sends back this information to the control unit 141 via a channel 142A.

Figure 3A:
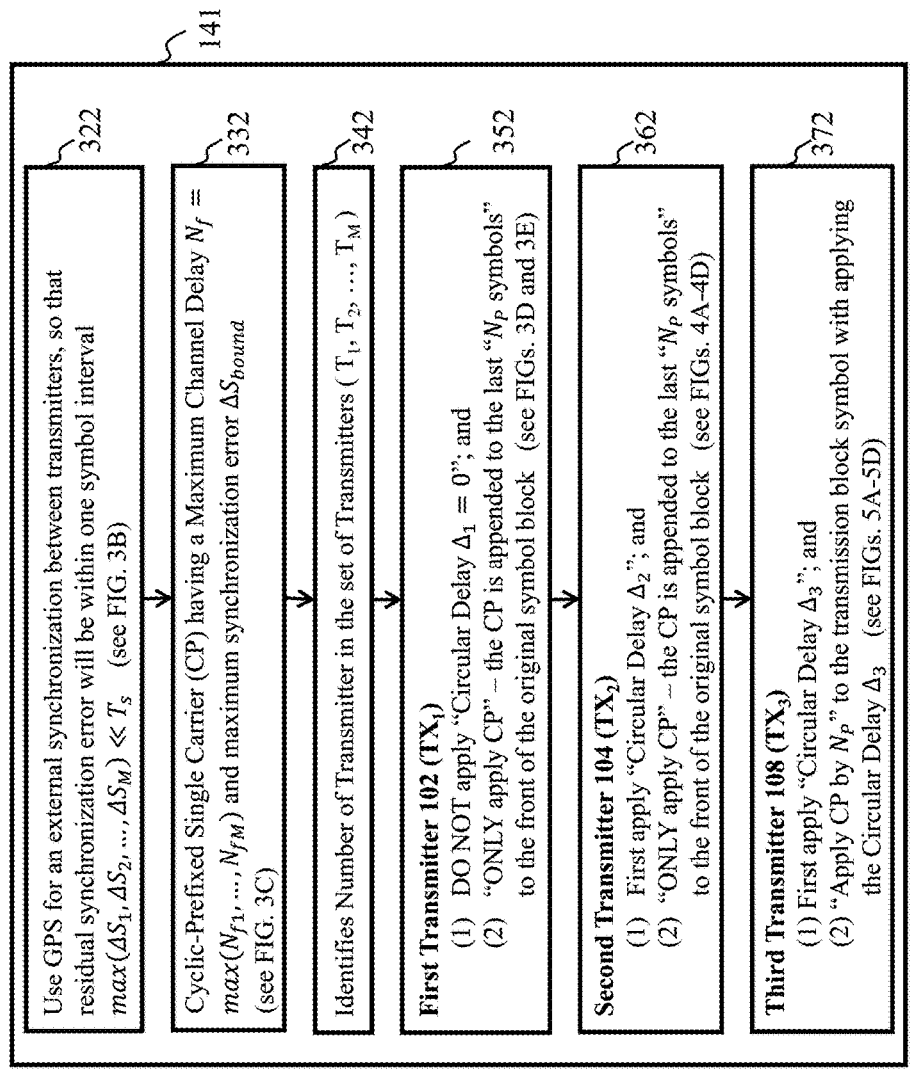
FIG. 3A shows is a block diagram illustrating a flow chart implementing the minimum cyclic prefix into the message, according to embodiments of the present disclosure.
Figure 3B:
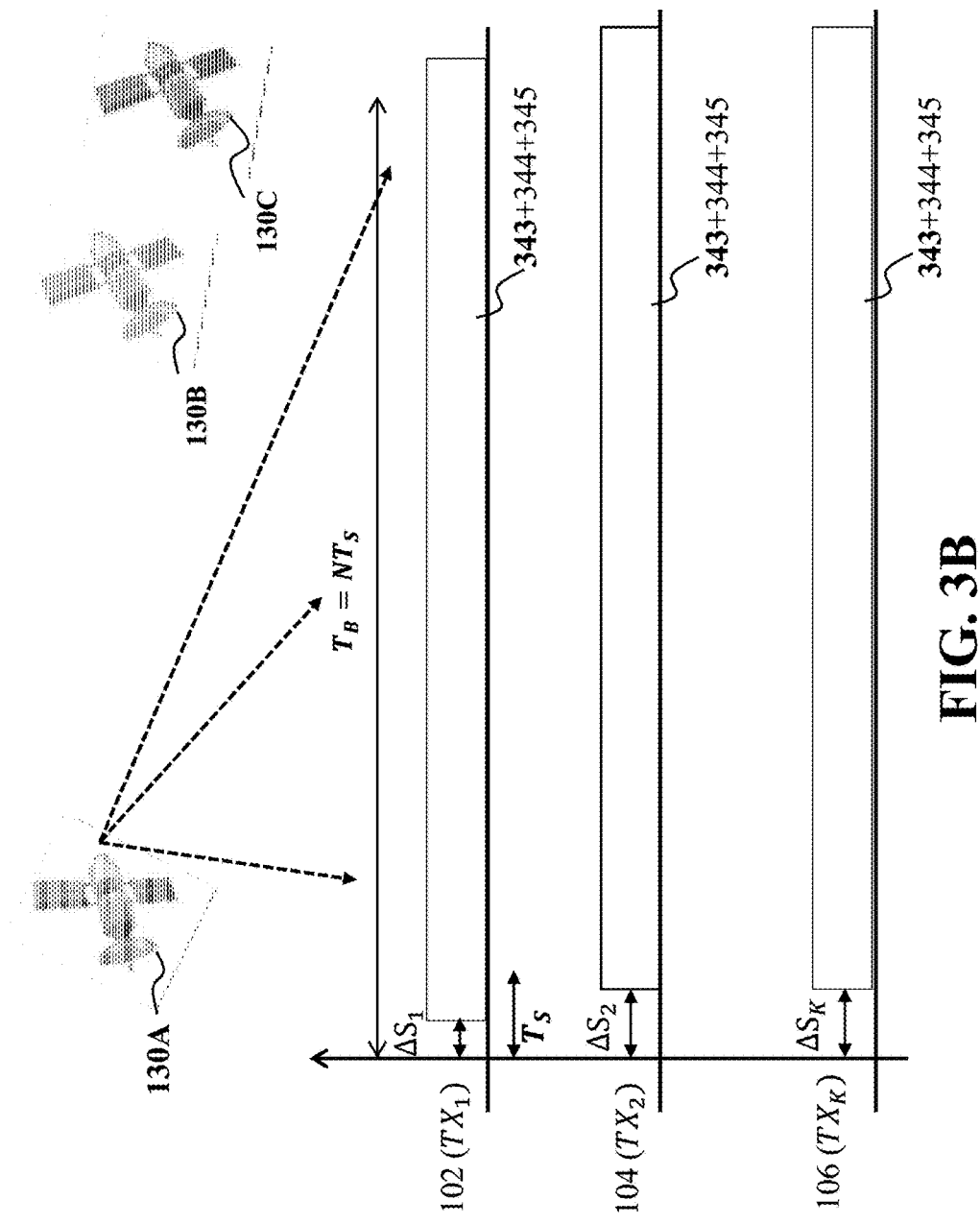
FIG. 3B is a schematic illustrating step 322 of FIG. 3A, according to embodiments of the present disclosure.

FIG. 3B is a schematic illustrating step 322 of FIG. 3A, according to embodiments of the present disclosure. This shows that a different transmitter may experience different time synchronization. They are all smaller than one symbol interval $T_S$.

Figure 3C:
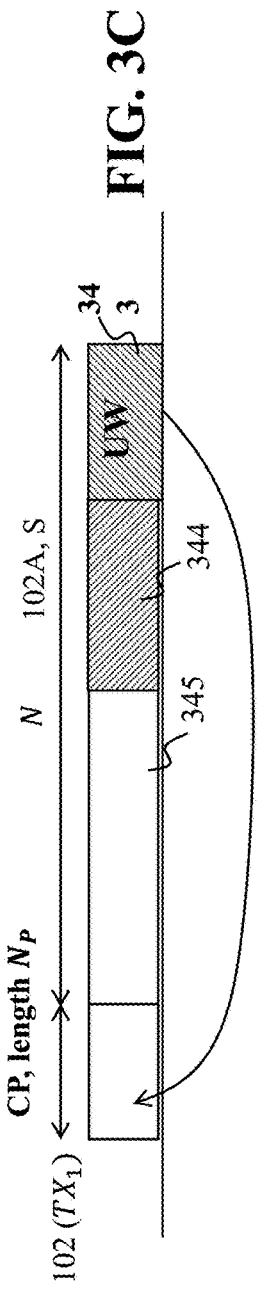
FIG. 3C is a schematic illustrating step 332 of FIG. 3A, according to embodiments of the present disclosure.

FIG. 3C is a schematic illustrating step 332 of FIG. 3A, according to embodiments of the present disclosure. In particular, FIG. 3C shows the CP operation that appends the $N_P$ number of symbols to the front of the transmission block symbol.

TX1 102 that forms a packet with N symbols, where the last $N_P$ symbols are used by a unique word (UW) or identification symbol, 343. The same UW, 343, can be attached to the front of the block symbol S, 102A, as the cyclic prefix. Since every transmitter needs to use the UW at the fixed location as TX1, the CDD operation is applied for blocks 344 to 345.

Figure 3D:
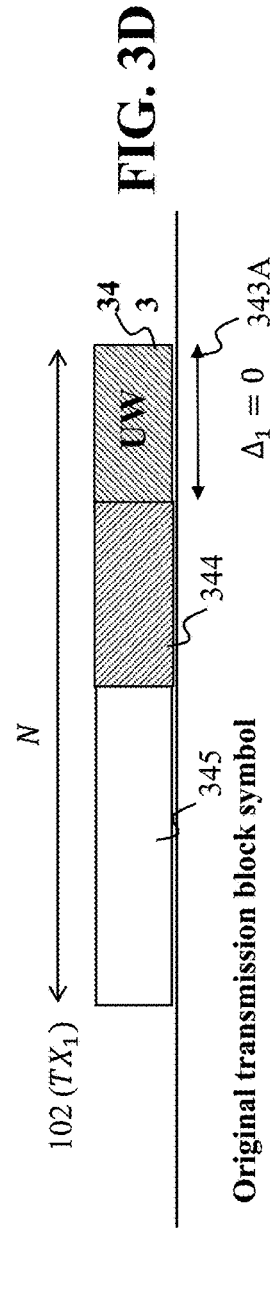
FIG. 3D and FIG. 3E are schematics illustrating step 352 of FIG. 3A, according to embodiments of the present disclosure.
Figure 3E:
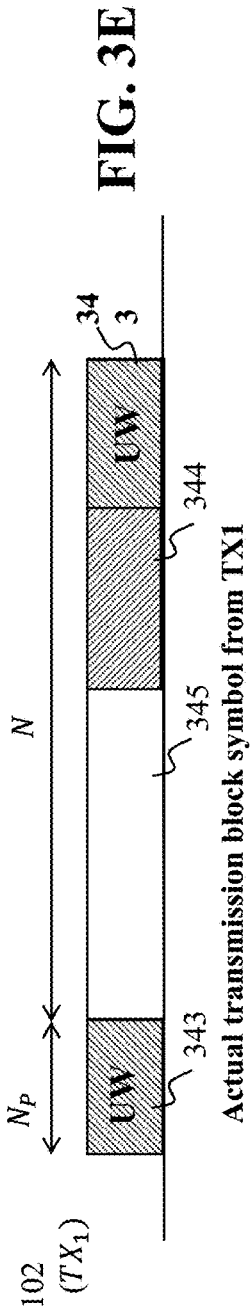

FIG. 3D and FIG. 3E are schematics illustrating step 352 of FIG. 3A, according to embodiments of the present disclosure. For example, transmitter 102 does not apply the CDD due to $\Delta_1=0$ (FIG. 3D), such that transmitter 102 only applies the cyclic prefix, that is, a copy of the cyclic prefix, block 343 is appended to the front of block 345.

FIG. 4A to FIG. 4D are schematics illustrating step 362 of FIG. 3A, according to embodiments of the present disclosure. FIG. 4A illustrates the second transmitter that applies $\Delta_2=N_P$ for the CDD delay, that is, Block 443 (block 343 of FIG. 3C is represented as block 443 in FIG. 4A to FIG. 4D), containing the UW is first cyclically rotated. Along with this part, every part in the original transmission block symbol are right shifted (FIG. 4B). FIG. 4C shows the transmission block structure after applying the cyclic rotation. In FIG. 4C, the length of block 344 is equal to $N_P$. In FIG. 4D, apply the cyclic prefix to the S2, 104A. That is, block 344 is appended to the front of block 443. Thus, FIG. 4D shows actual transmission block symbol from transmitter 104. Since the location of UW is changed from the last part of S, 102A, UW is not used as the cyclic prefix.

Still referring to FIG. 4A-4D, for example, TX2, 104, forms a new packet with N symbols 104A. Due to CDD operation, the format order will be UW-345-344 with respect to the format order 345-344-UW, which was formed by TX1. However, if CDD operation is only applied to data containing blocks 345-344 within a packet, then the CDD operation will fail in removing interference. That is, the interference is not able to be removed from CDD operation. Thus, the present disclosure can overcome this problem by applying CDD operation to the entire packet 104A with data symbols 345-344-UW. That is, the entire packets with data symbols 345-344-UW are rotated without fixing the location of the UW, 443 (block 343 of FIG. 3C is represented as Block 443).

FIGS. 5A-5D are schematics illustrating step 372 of FIG. 3A, according to embodiments of the present disclosure; FIG. 5A shows the third transmitter that applies $\Delta_3=2N_P$ for the CDD delay, that is, Blocks 543 (block 343 of FIG. 3C is represented as block 543 in FIG. 5A to FIG. 5D), that contains the UW and 344 are cyclically delayed (FIG. 5B). Every part should right shifted by $2N_P$. A part of 345, that is, 345A, should be used as a prefix. Thus, block 345A is appended to the front of block 344. FIG. 5D shows actual transmission block symbol from transmitter 106. Thus, the location UW is changed again comparing with them in FIG. 3D and FIG. 4C.

Figure 5E:
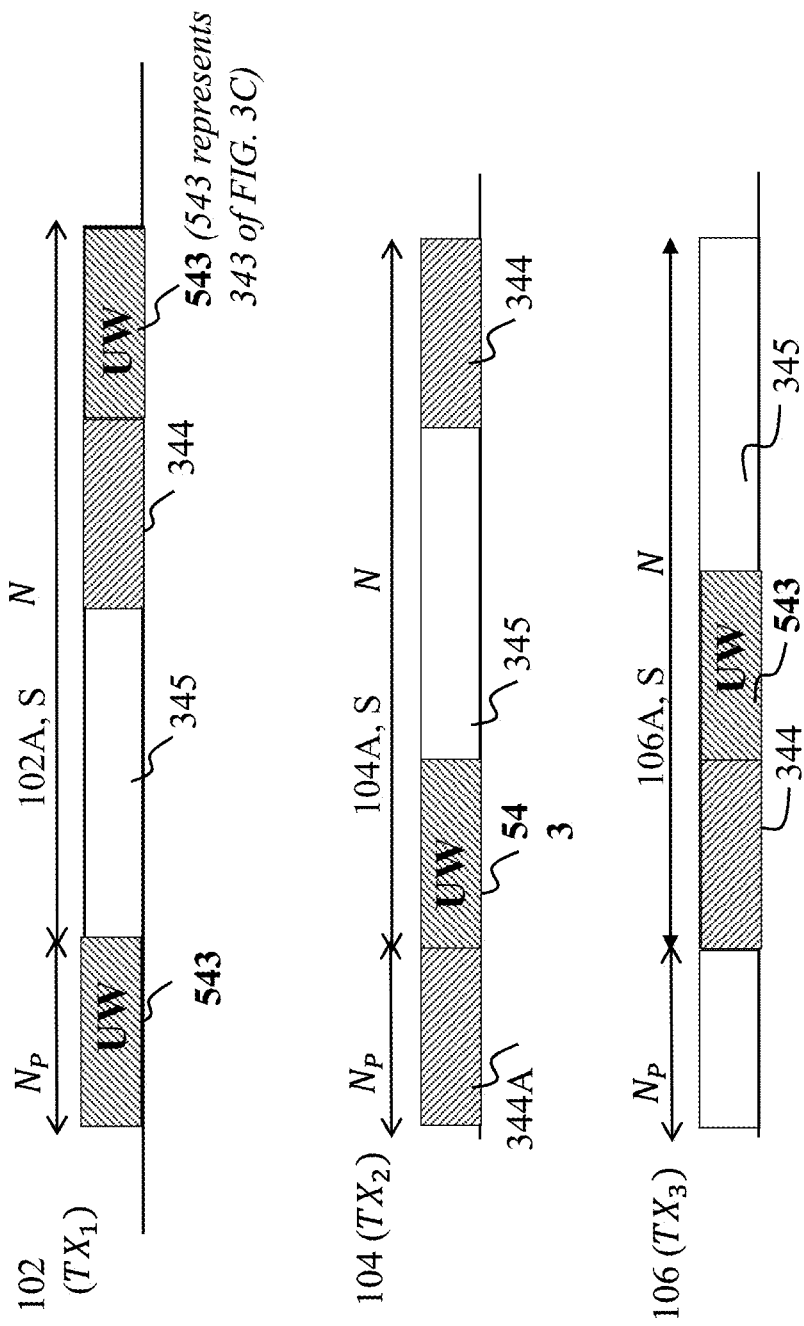
FIG. 5E is a schematic illustrating the location of the unique word (UW) for CDD transmitters, according to embodiments of the present disclosure.

FIG. 5E shows that the original UW, 543 (block 343 of FIG. 3C is represented as block 543 in FIG. 5E), is located at different places depending on the index of the CDD transmitter. Thus, it is possible now that a fixed location for a particular CDD transmitter can be determined. Such that, at the receiver side, if the identification process is applied to a particular CDD transmitter based on the location of the UW, it is now possible to identify it. And thus, the receiver can identify all the CDD transmitters even in the presence of interfering transmitters. Since CDD operation is applied to all CDD transmitters, it is possible to achieve transmit diversity without interference from other CDD transmitters and non-CDD-transmitters.

Thus, this embodiment of the present disclosure can provide many benefits in achieving transmit diversity gain with wireless transmissions, including being useful for single carrier transmissions which use a unique word as the cyclic prefix, for example, 802.11ad system. Such that, by applying a different circular rotation of the unique word, the receiver can identify whether a particular device uses CDD operation or not. Wherein, the receiver can easily detect a fixed number of devices that apply CDD operation. Regarding after detection of the CDD transmitters, the receiver can combine the signal only from the CDD transmitters.

Figure 6A:
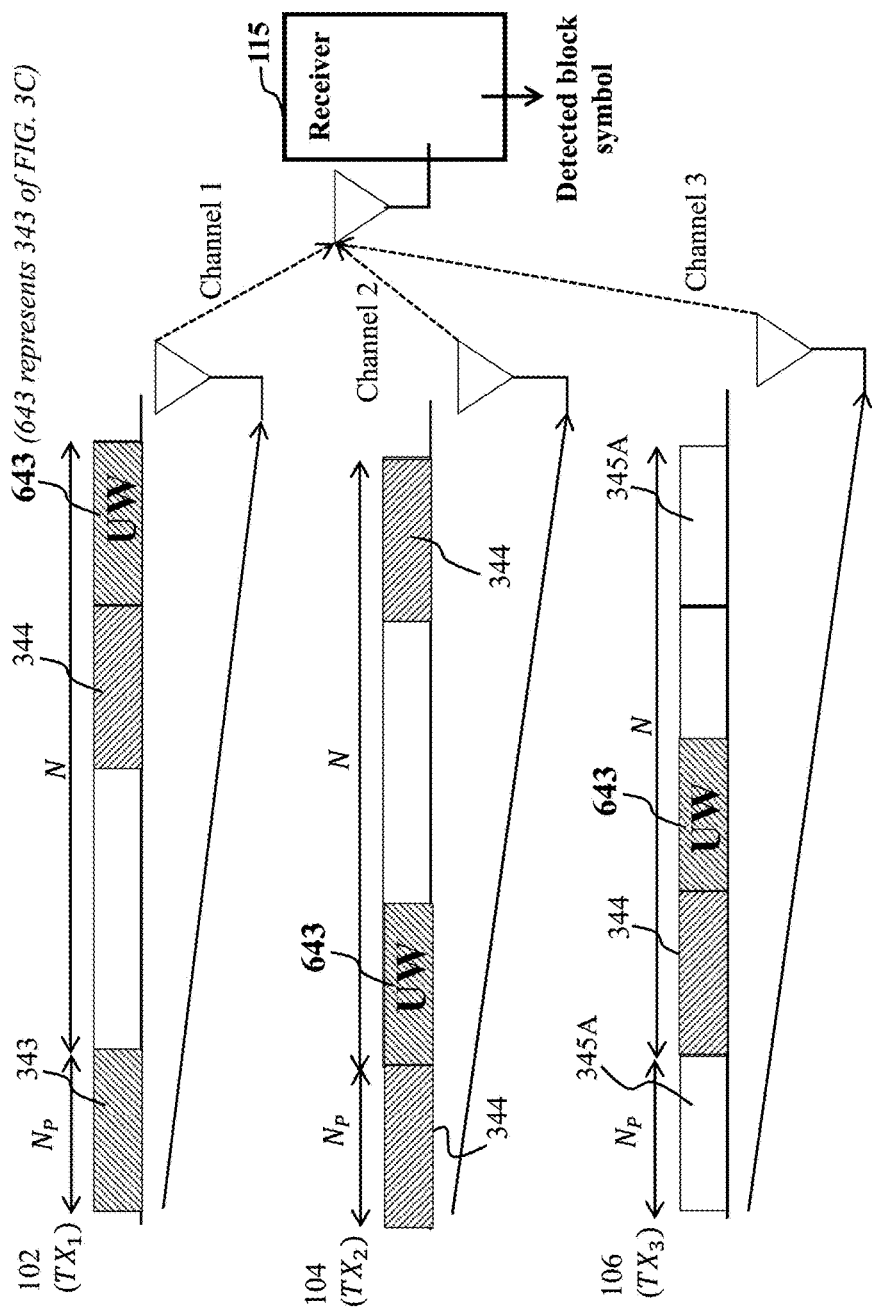
FIG. 6A shows a schematic of overall transmission scheme incorporating both CDD and CP transmission, according to embodiments of the present disclosure.
Figure 6B:
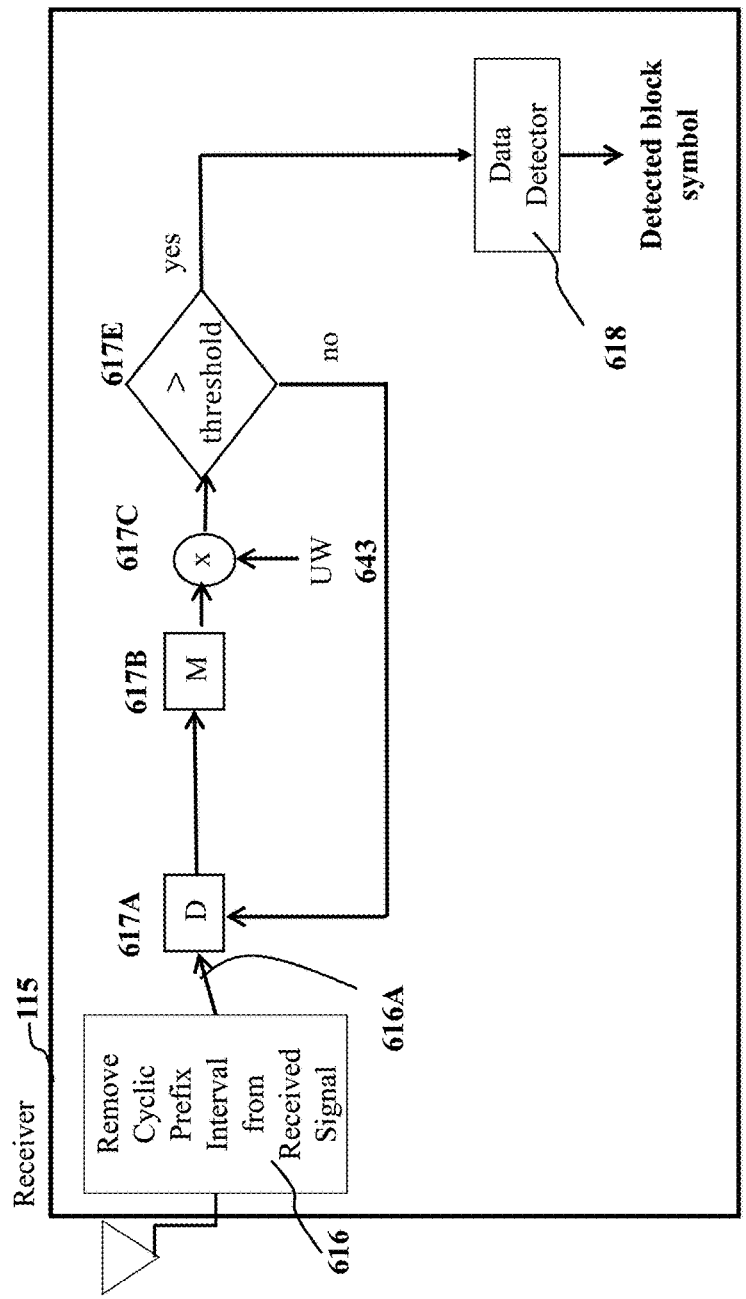
FIG. 6B shows the receiver operation, according to embodiments of the present disclosure.

FIG. 6A shows is a schematic of, according to embodiments of the present disclosure. FIG. 6A illustrates an example with three transmitters. Each transmitter applied its own CDD delay and then applies cyclic prefix according the computed minimal CP length determined in step 245 OF FIG. 2A. Depending on the transmitter index, a final transmission block has a different structure, although they are shifted versions from one another. In each transmission block, the UW, Block 643 (block 643 in FIG. 6A is represented as block 343 of FIG. 3C), is located in a different location. The receiver operation, 115, is provided in FIG. 6A.

Receiver 115 first removes the cyclic prefixed interval in block 616, from the received signal since each transmitter applies the cyclic prefix. And then in blocks 617A-617E, the receiver identifies the CDD transmitters. For the received signal with the removal of the CP signal, the receiver applies the cross correlation at 617C using the UW, 643. Since UW is composed of several symbols, it is required to keep $N_P$ symbols in the memory, 617B. In 617E, it is required to compare the correlator's output with respect to a given threshold to decide whether a particular CDD transmitter is identified or not. For an entire N symbols, it is required to apply the cross correlation, so that a time delay, 617A, is required for a sliding window operation. Having detected the received signal transmitted from a CDD transmitter, apply the data detector, 618. Then, the detected block symbol can be obtained as output.

Figure 7:
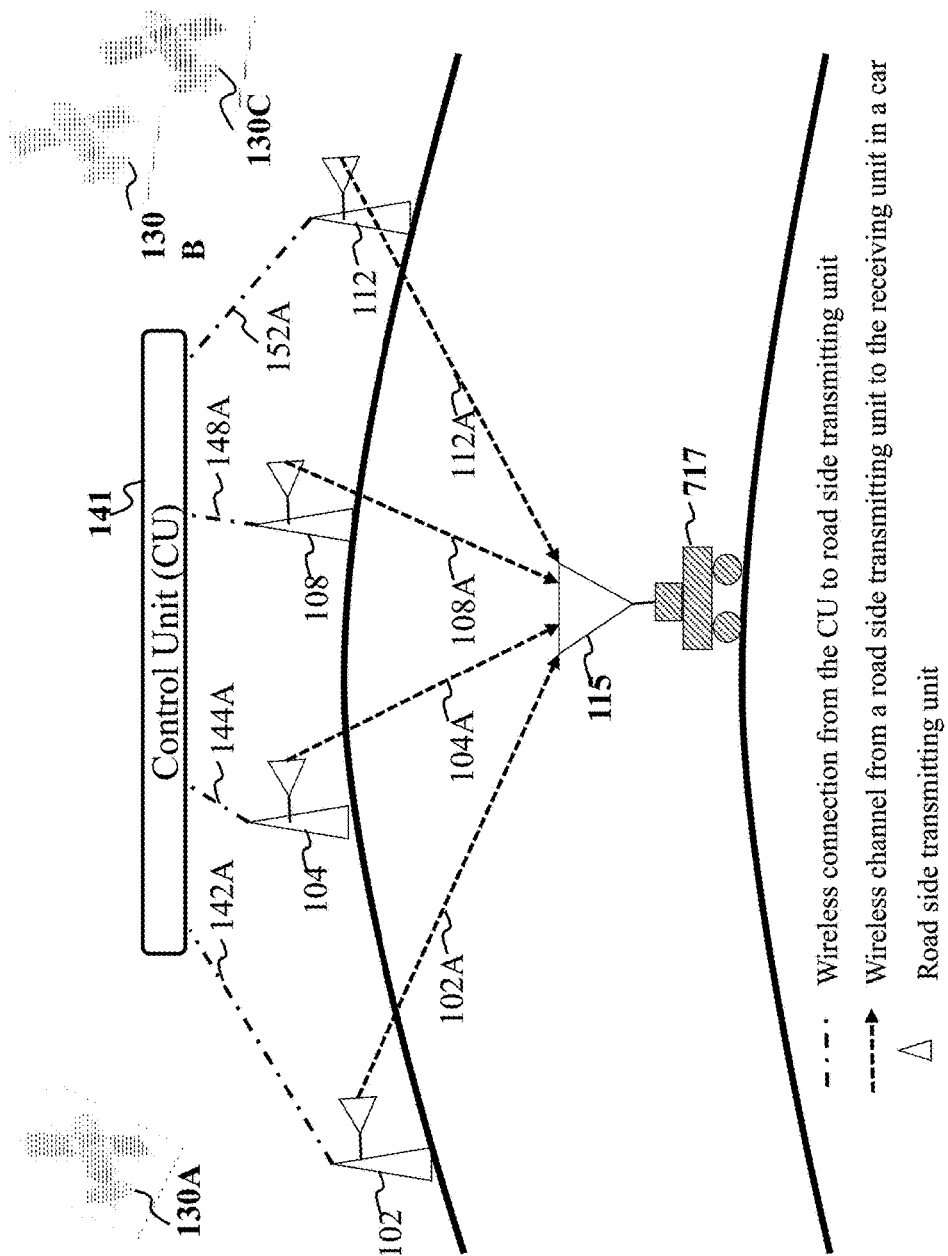
FIG. 7 shows is a schematic of a vehicle-to-X (V2X) communication network, according to some embodiments of the present disclosure.

FIG. 7 shows is a schematic of a vehicle-to-X (V2X) communication network, according to some embodiments of the present disclosure; FIG. 7 includes control unit 141 and multiple road-side transmitting units 102, 104, 108, 112. Between the control unit and road-side transmitting units are wirelessly connected via 142A, 144A, 148A, 152A. Between each road-side and the receiving unit 115 on the moving vehicle 717 are connected via wireless link 102A, 104A, 108A, 112A. Depending on the channel environment between road-side transmitting units and the moving vehicle, higher transmission reliability can be achieved by using a proposed idea.

Figure 8:
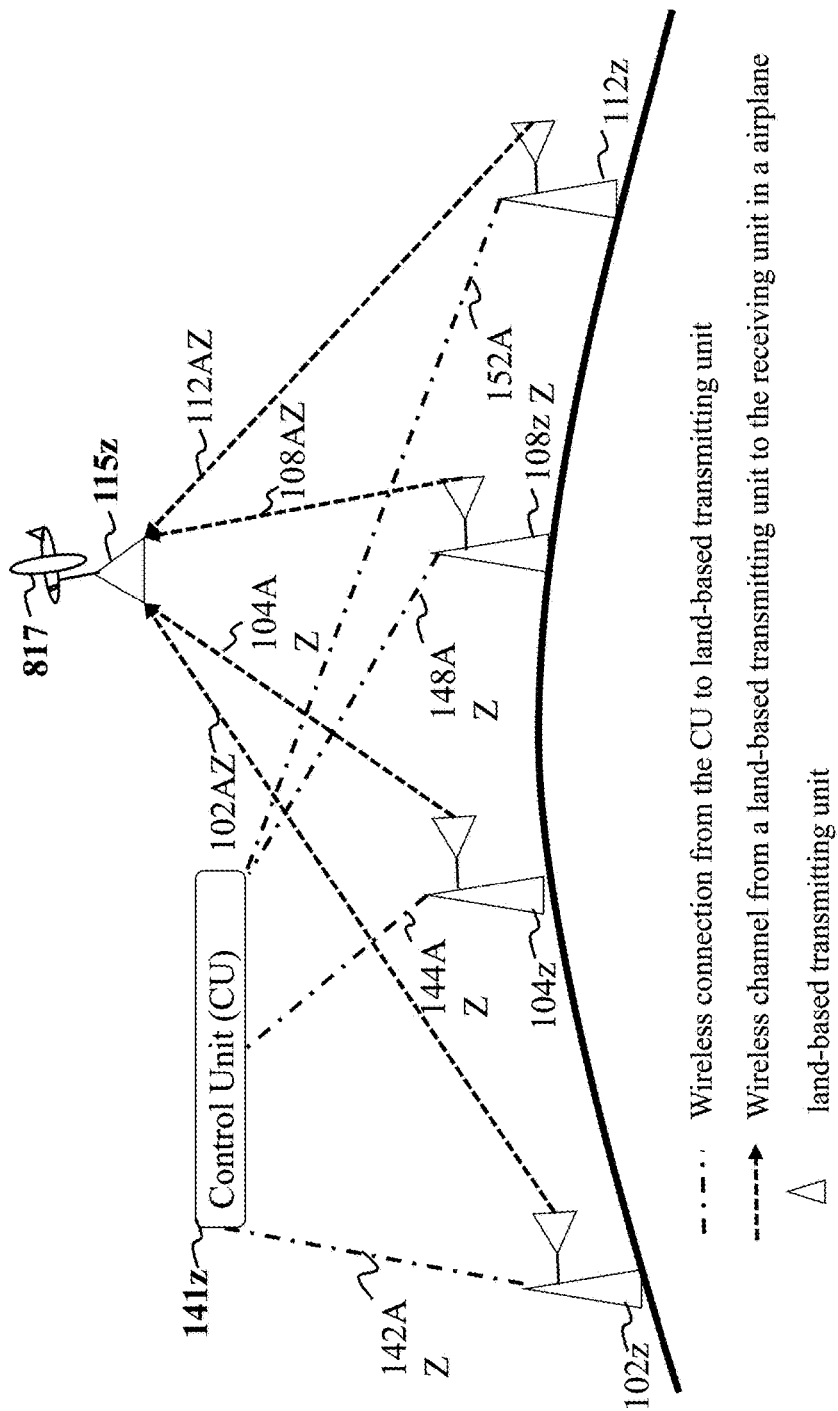
FIG. 8 shows is a schematic of an air-based wireless communication network, according to embodiments of the present disclosure.

FIG. 8 shows is a schematic of an air-based wireless communication network, according to some embodiments of the present disclosure. FIG. 8 includes control unit 141z and multiple land transmitting units 102z, 104z, 108z, 112z. Between the control unit 141z and land-based transmitting units are wirelessly connected via 142AZ, 144AZ, 148AZ, 152AZ. Between each land-based and the receiving unit 115z on the moving airplane 817 are connected via wireless link 102AZ, 104AZ, 108AZ, 112AZ. Depending on the channel environment between land-based transmitting units and the moving vehicle, higher transmission reliability can be achieved by using a proposed idea.

Features

Aspects of the present disclosure include each transmitter identifiable message can be different from other transmitter identifiable messages transmitted from the transmitting transmitters, and some data symbols vary for at least some of the different transmitter identifiable messages, and the at least one identification symbol is the same for all the different transmitter identifiable messages. Other aspects include the controller that can form a plurality of different transmitter identifiable messages, such that the at least one identification symbol is fixed for all different transmitter identifiable messages, and some data symbols vary for at least some of the different transmitter identifiable messages. Wherein the at least one identification symbol can be predetermined. It is possible that the at least one identification symbol is at least two identification symbols, such that the at least two identification symbols are orthogonal to one another, and are predetermined, so as to increase a number of transmitters that support the CDD operation.

Other aspects of the present disclosure can include the controller further configured to determine a tap delay for a communication channel between a receiver and each transmitter in the set of transmitters to produce a set of tap delays. The controller can determine a minimal length of a cyclic prefix as a function of a sum of a synchronization error of operations of each transmitter and a maximal tap delay in the set of tap delays. Along with the controller that controls at least some transmitters in the set of transmitters to transmit the transmitter identifiable messages to the receiver using the CDD with the cyclic prefix having at least the minimal length. Wherein the set of transmitters synchronizes the operations by operating on a universal clock at the controller using signals from a global navigation satellite system (GNSS). Further, the controller can be configured to determine a delay of transmission for each transmitter in the set of transmitters, based on the minimal length of the cyclic prefix. It is possible that the controller can be configured to determine a length of the message. Determine a number of transmitters from the set of transmitters for transmission of the message, based on the determined length of the message and the minimal length of the cyclic prefix, so as to obtain a maximum number of transmitters for transmission. Select the maximum number of the transmitters from the set of transmitters to form a subset of transmitting transmitters based upon a magnitude of channel gains. Finally, determine a delay of transmission for each transmitter in the subset of transmitting transmitters, based on the minimal length of the cyclic prefix. Further, the receiver can be configured to detect the identification symbols at different locations in the transmitter identifiable messages received from some transmitting transmitters from the set of transmitters. As well as, estimate a quality of the communication channels based on a number of detected identification symbols.

Still, other aspects of the present disclosure can include the transmitter identifiable message includes packet-based Orthogonal Frequency Division Multiplexed (OFDM) and single carrier transmissions from at least two transmitters in the set of transmitters. Along with aspects that can include at least two transmitters in the set of transmitters include a multimedia transmitting device and the transmitted transmitter identifiable message includes packet-based orthogonal frequency division multiplexed (OFDM) and single carrier transmissions including multimedia content. Also aspects of the set of transmitters are in communication from at least one a vehicle-to-X (V2X) communication network, a wireless communication network or a vehicle-infrastructure cooperative automated driving system.

Figure 9:
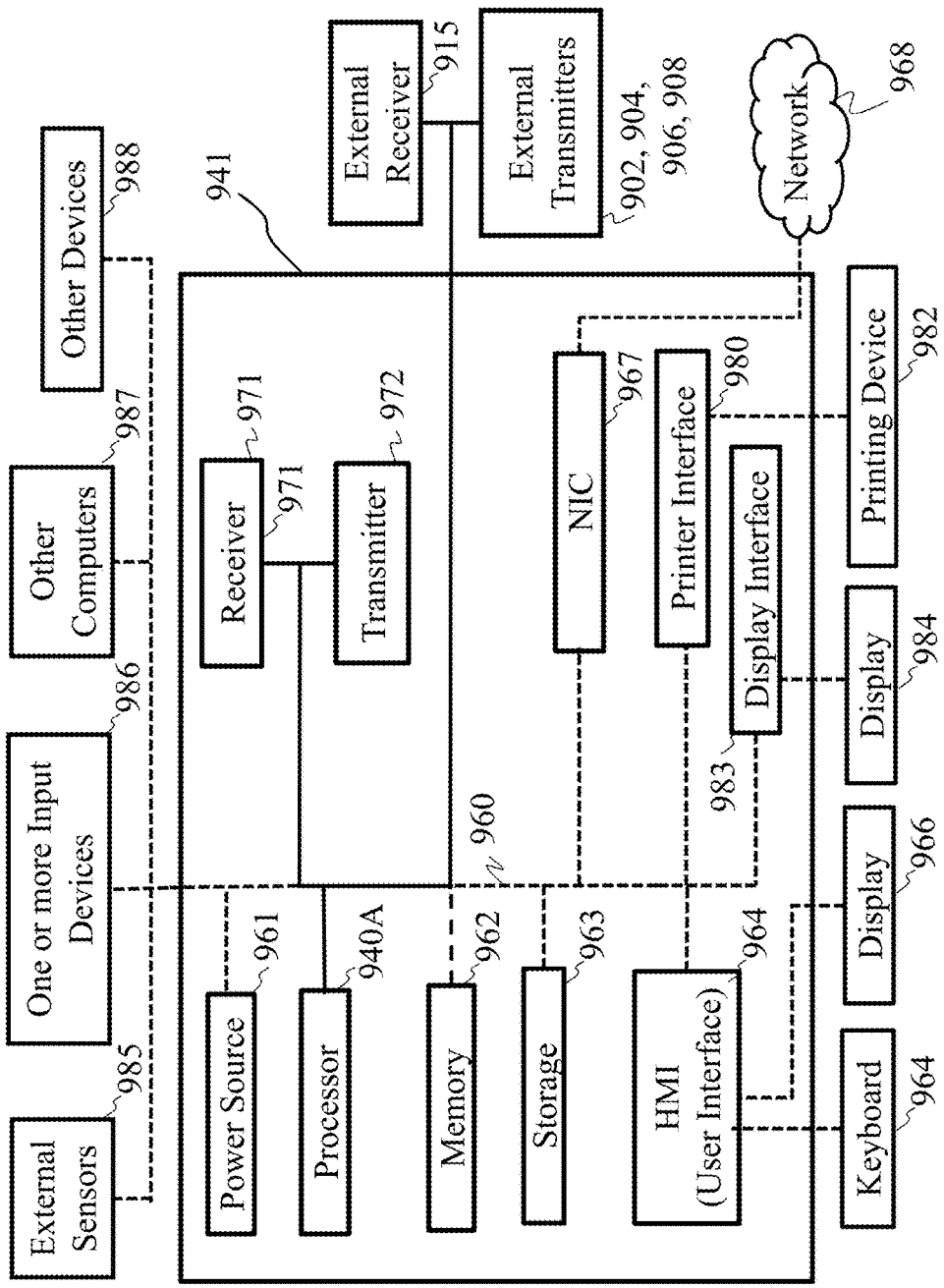
FIG. 9 is a block diagram of another control unit that includes a coordination processor for controlling the communication system, according to some embodiments of the present disclosure.

FIG. 9 is a block diagram of a control unit 941 that includes the processor 940A for controlling the communication system, in accordance with some embodiments of the present disclosure. The processor 940A may be any type of processor configured for communication and network system operations. The control unit 941 can include a power source 961, depending upon the application the power source may be optionally located outside of the control unit 941. The processor 940A can be configured to execute stored instructions, as well as be in communication with a memory 962 that stores instructions that are executable by the processor 940A. The processor 940A can be a single core processor, a multi-core processor, a computing cluster, or any number of other configurations. The processor or coordination processor 940A is connected through a bus 960 to one or more input and output devices 986. The memory 962 can include random access memory (RAM), read only memory (ROM), flash memory, or any other suitable memory systems. It is contemplated the processor 940A can be a coordination processor 940A responsible for determining and communicating the parameters. i.e. number of transmitters, CDD delays, CP sizes, for the system, among other things.

Still referring to FIG. 9, the control unit 941 can also include a storage device 963 adapted to store supplementary data and/or software modules used by processor 940A. For example, the storage device 963 can store historical data relating to similar different types of communication networks and systems, related to for example, CP configurations, transmitter configurations, receiver configurations, synchronization error data, etc., among other things. The storage device 963 can include a hard drive, an optical drive, a thumb-drive, an array of drives, or any combinations thereof.

A human machine interface (HMI or User Interface) 964 within the control unit 941 can connect the system to a keyboard 964 and display device 966. The control unit 941 can be linked through the bus 960 to a display interface 983 adapted to connect to a display device 984, wherein the display device 984 can include a computer monitor, camera, television, projector, or mobile device, among others.

Still referring to FIG. 9, a printer interface 980 can also be connected through bus 960 and adapted to connect to a printing device 982, wherein the printing device 982 can include a liquid inkjet printer, solid ink printer, large-scale commercial printer, thermal printer, UV printer, or dye-sublimation printer, among others. A network interface controller 967 is adapted to connect through the bus 960 to a network 968. The communication data or related communication data, among other things, can be rendered on a display device, imaging device, and/or printing device.

Still referring to FIG. 9, the communication data or related communication data, among other things, can be transmitted over a communication channel of the network 968, and/or stored within the storage system 963 for storage and/or further processing. Further, the communication data or related communication data may be received wirelessly or wire from a receiver 971 or transmitted via a transmitter 972 wirelessly or wire, the receiver and transmitter are both connected through the bus 960 to the control unit 941.

The control unit 941 may be connected to external sensors 985. For example, the external sensors 985 may include sensors for, speed, direction, air flow, weather conditions, etc. The control unit 941 may be connected to other external computers 987 and other devices 988. Further, an external receiver 915 and external transmitters 902, 904, 906, 908 can be in communication with the control unit 941.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A communication system, comprising:
a controller communicatively connected to a set of transmitters,
wherein the controller forms a message with ordered symbols including data symbols and at least one identification symbol, and controls transmitters from the set of transmitters to transmit the message using a cyclic delay diversity (CDD), wherein the data symbols includes a length and the at least one identification symbol includes a length, such that the length of the data symbols and the length of the at least one identification symbol form a length of the ordered symbols which forms a message length,
wherein each transmitting transmitter prior to transmitting, circularly rotates the ordered symbols of the message with a unique shift, such that the unique shift includes a location of the at least one identification symbol to form a transmitter identifiable message, then copies some symbols located at an end of the message, wherein a number of the copied symbols is based on a predetermined cyclic prefix length, into a first position in the rotated message, and transmits via each transmitting transmitter the transmitter identifiable message.

2. The communication system of claim 1, wherein each transmitter identifiable message is different from other transmitter identifiable messages transmitted from the transmitting transmitters, and some data symbols vary for at least some of the different transmitter identifiable messages, and the at least one identification symbol is the same for all the different transmitter identifiable messages.

3. The communication system of claim 1, wherein the controller forms a plurality of different transmitter identifiable messages, such that the at least one identification symbol is fixed for all different transmitter identifiable messages, and some data symbols vary for at least some of the different transmitter identifiable messages.

4. The communication system of claim 1, wherein the controller broadcasts the at least one identification symbol.

5. The communication system of claim 1, wherein the controller is further configured to
determine a tap delay for a communication channel between a receiver and each transmitter in the set of transmitters to produce a set of tap delays;
determine a minimal length of a cyclic prefix as a function of a sum of a synchronization error of operations of each transmitter and a maximal tap delay in the set of tap delays; and
control at least some transmitters in the set of transmitters to transmit the transmitter identifiable messages to the receiver using the CDD with the cyclic prefix having at least the minimal length.

6. The communication system of claim 5, wherein the set of transmitters synchronizes the operations by operating on a universal clock at the controller using signals from a global navigation satellite system (GNSS).

7. The communication system of claim 5, wherein the controller is configured to determine a delay of transmission for each transmitter in the set of transmitters, based on the minimal length of the cyclic prefix.

8. The communication system of claim 5, wherein the controller is configured to
determine a length of the message;
determine a number of transmitters from the set of transmitters for transmission of the message, based on the determined length of the message and the minimal length of the cyclic prefix, so as to obtain a maximum number of transmitters for transmission;
select the maximum number of the transmitters from the set of transmitters to form a subset of transmitting transmitters based upon a magnitude of channel gains; and
determine a delay of transmission for each transmitter in the subset of transmitting transmitters, based on the minimal length of the cyclic prefix.

9. The communication system of claim 5, wherein the receiver is configured to
detect the identification symbols at different locations in the transmitter identifiable messages received from some transmitting transmitters from the set of transmitters; and
estimate a quality of the communication channels based on a number of detected identification symbols.

10. The communication system of claim 1, wherein the transmitter identifiable message includes packet-based Orthogonal Frequency Division Multiplexed (OFDM) and single carrier transmissions from at least two transmitters in the set of transmitters.

11. The communication system of claim 1, wherein at least two transmitters in the set of transmitters include a multimedia transmitting device and the transmitted transmitter identifiable message includes packet-based orthogonal frequency division multiplexed (OFDM) and single carrier transmissions including multimedia content.

12. The communication system of claim 1, wherein the set of transmitters are in communication from at least one a vehicle-to-X (V2X) communication network, a wireless communication network or a vehicle-infrastructure cooperative automated driving system.

13. A method for transmitting a message that is a non-data-aided signal from transmitters in a set of transmitters to a receiver, wherein operations of the set of transmitters are synchronized with a synchronization error, comprising:
forming, via a processor, a message with ordered symbols including data symbols and at least one identification symbol, wherein the at least one identification symbol is predetermined and is at least two identification symbols, such that the at least two identification symbols are orthogonal to one another, and are predetermined, so as to increase a number of transmitters that support the CDD operation; and
controlling, via the processor, the transmitters in the set of transmitters to transmit the message using a cyclic delay diversity (CDD),
wherein each transmitting transmitter prior to transmitting, circularly rotates the ordered symbols of the message with a unique shift, such that the unique shift includes a location of the at least one identification symbol to form a transmitter identifiable message, then copies some symbols located at an end of the message,
wherein a number of the copied symbols is based on a predetermined cyclic prefix length, into a first position in the rotated message, and transmits via each transmitting transmitter the transmitter identifiable message,
wherein the processor is communicatively connected to the set of transmitters and the receiver.

14. The method of claim 13, wherein each transmitter identifiable message is different from other transmitter identifiable messages transmitted from the transmitting transmitters, and some data symbols vary for at least some of the different transmitter identifiable messages, and the at least one identification symbol is the same for all the different transmitter identifiable messages.

15. The method of claim 13, wherein the processor forms a plurality of different transmitter identifiable messages, such that the at least one identification symbol is fixed for all different transmitter identifiable messages, and some data symbols vary for at least some of the different transmitter identifiable messages, or wherein the copied symbols include some data symbols, the at least one identification symbol and at least one data symbol, or some combination thereof.

16. The method of claim 13, wherein the set of transmitters synchronizes the operations by operating on a universal clock using signals from a global navigation satellite system (GNSS) at the processor.

17. The method of claim 13, wherein the processor is configured to:
determine a length of the message;
determine a number of transmitters from the set of transmitters for transmission of the message, based on the determined length of the message and the minimal length of the cyclic prefix, so as to obtain a maximum number of transmitters for transmission; and
select the maximum number of the transmitters from the set of transmitters to form a subset of transmitting transmitters, to ensure the maximum reliability at the receiver for transmitting the message,
determine a delay of transmission for each transmitter in the subset of transmitting transmitters, based on the minimal length of the cyclic prefix.

18. A non-transitory computer readable storage medium embodied thereon a program executable by a processor for performing a method, the method comprising:
acquiring a synchronization error bounding an accuracy of a synchronization of operations of a set of transmitters;
forming, via the processor, a message with ordered symbols including data symbols and at least one predetermined identification symbol, wherein the at least one predetermined identification symbol is at least two identification symbols, such that the at least two identification symbols are orthogonal to one another, and are predetermined, so as to increase a number of transmitters that support the CDD operation;
controlling, via the processor, transmitters from the set of transmitters to transmit the message using a cyclic delay diversity (CDD),
wherein each transmitting transmitter prior to transmitting, circularly rotates the ordered symbols of the message with a unique shift, such that the unique shift includes a location of the at least one identification symbol to form a transmitter identifiable message, then copies some symbols located at an end of the message,
wherein a number of the copied symbols is based on a predetermined cyclic prefix length, into a first position in the rotated message, and transmits via each transmitting transmitter the transmitter identifiable message,
wherein the processor is communicatively connected to the set of transmitters and the receiver.

19. A communication system, comprising:
a controller communicatively connected to a set of transmitters,
wherein the controller forms a message with ordered symbols including data symbols and at least one identification symbol, and controls transmitters from the set of transmitters to transmit the message using a cyclic delay diversity (CDD), wherein the at least one identification symbol is predetermined and is at least two identification symbols, such that the at least two identification symbols are orthogonal to one another, and are predetermined, so as to increase a number of transmitters that support the CDD operation,
wherein each transmitting transmitter prior to transmitting, circularly rotates the ordered symbols of the message with a unique shift, such that the unique shift includes a location of the at least one identification symbol to form a transmitter identifiable message, then copies some symbols located at an end of the message,
wherein a number of the copied symbols is based on a predetermined cyclic prefix length, into a first position in the rotated message, and transmits via each transmitting transmitter the transmitter identifiable message.

* * * * *